(12) United States Patent
Cheng et al.

(10) Patent No.: US 11,475,828 B2
(45) Date of Patent: Oct. 18, 2022

(54) DISPLAY SCREEN AND DRIVING METHOD OF DISPLAY SCREEN

(71) Applicants: WUHAN TIANMA MICROELECTRONICS CO., LTD, Wuhan (CN); WUHAN TIANMA MICROELECTRONICS CO., LTD. SHANGHAI BRANCH, Shanhai (CN)

(72) Inventors: Lin Cheng, Shanghai (CN); Yingying Wu, Shanghai (CN); Xingyao Zhou, Shanghai (CN)

(73) Assignees: WUHAN TIANMA MICROELECTRONICS CO., LTD, Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 17/215,984

(22) Filed: Mar. 29, 2021

(65) Prior Publication Data

US 2021/0217351 A1 Jul. 15, 2021

(30) Foreign Application Priority Data

Dec. 28, 2020 (CN) .......................... 202011583557.4

(51) Int. Cl.
  *G06F 3/041* (2006.01)
  *G09G 3/20* (2006.01)
  *G06F 3/044* (2006.01)

(52) U.S. Cl.
  CPC .......... *G09G 3/2092* (2013.01); *G06F 3/0412* (2013.01); *G06F 3/0445* (2019.05); *G06F 3/0446* (2019.05); *G06F 3/0448* (2019.05)

(58) Field of Classification Search
  None
  See application file for complete search history.

(56) References Cited

U.S. PATENT DOCUMENTS

2015/0062062 A1* 3/2015 Han ...................... G06F 3/0446
                                                                                                345/174
2016/0370940 A1* 12/2016 Zhao ................... G06F 3/04166
2019/0294282 A1* 9/2019 Dun ....................... G06F 3/0416

FOREIGN PATENT DOCUMENTS

CN         102955635 B        11/2015
CN         106527821 B         6/2019

* cited by examiner

*Primary Examiner* — Carl Adams
(74) *Attorney, Agent, or Firm* — von Briesen & Roper, s.c.

(57) ABSTRACT

Provided are a touch display screen and a driving method of the touch display screen. The driving method of the touch display screen includes: one frame cycle includes at least one touch control stage, the at least one touch control stage is staggered from a scanning stage of a pixel row electrically connected to at least one first scanning line and overlaps a scanning stage of a pixel row electrically connected to at least one second scanning line. The first scanning lines overlap edge regions of the touch electrode rows in the second direction, and the second scanning lines overlap center regions of the touch electrode rows in the second direction.

20 Claims, 17 Drawing Sheets

DISPLAY SCREEN AND DRIVING METHOD OF DISPLAY SCREEN

CROSS-REFERENCE TO RELATED APPLICATIONS

This application claims priority to Chinese patent application No. 202011583557.4 filed with CNIPA on Dec. 28, 2020, the disclosure of which is incorporated herein by reference in its entirety.

TECHNICAL FIELD

Embodiments of the present disclosure relate to the field of display technology and, in particular, a touch display screen and a driving method thereof.

BACKGROUND

With the development of human-machine interaction technology, touch technologies are increasingly used in various display apparatuses. Among them, the capacitive touch technology is widely used and favored by users because of the advantages of resistance to wear, long service life, low maintenance cost, support for gesture recognition, and multi-touch.

In the conventional touch display screen, one frame cycle includes a touch control stage and a display stage, and the touch control stage and the display stage are staggered. On the one hand, the duration of the display stage becomes shorter and the display quality of pictures is affected, on the other hand, the touch performance of the touch display screen is poor.

SUMMARY

A touch display screen and a driving method thereof are provided by the present disclosure to improve the display quality of pictures and the touch performance of the touch display screen.

In an embodiment, a driving method of a touch display screen is provided in the present disclosure. The touch display screen includes a substrate, multiple pixels, multiple scanning lines and a touch electrode layer. The multiple scanning lines extend along a first direction and are arranged on one side of the substrate in a second direction, the multiple pixels are arranged as multiple pixel rows extending along the first direction and pixels in each pixel row are electrically connected to at least one scanning line. The touch electrode layer at least partially overlaps the multiple scanning lines in a direction perpendicular to a plane where the substrate is located. The touch electrode layer includes multiple touch electrode rows formed by multiple touch electrodes, the multiple touch electrodes include a special-shaped touch electrode, the multiple touch electrode rows include a special-shaped touch electrode row, the special-shaped touch electrode tow includes the special-shaped touch electrode, and the multiple touch electrode rows extend along the first direction.

The touch display screen includes a display region, the display region includes multiple sub-display regions arranged in the second direction, and the multiple sub-display regions are in one-to-one correspondence with the multiple touch electrode rows and each of the multiple sub-display regions overlaps a respective one of the multiple touch electrode rows. The multiple sub-display regions include at least one special-shaped sub-display region, and the at least one special-shaped sub-display region corresponds to the special-shaped touch electrode row. In the multiple sub-display regions, the multiple scanning lines include first scanning lines and second scanning lines. The first scanning lines overlap edge regions of the multiple touch electrode rows in the second direction and the second scanning lines overlap center regions of the multiple touch electrode rows in the second direction.

The driving method of the touch display screen includes that: one frame cycle includes at least one touch control stage, the at least one touch control stage is staggered from a scanning stage of a pixel row electrically connected to at least one of the first scanning lines and overlaps a scanning stage of a pixel row electrically connected to at least one of the second scanning lines.

In an embodiment, a touch display screen is provided in the present disclosure, and which is driven by the driving method according to the above-mentioned embodiment.

BRIEF DESCRIPTION OF DRAWINGS

Other features, objects and advantages of the present disclosure will become more apparent from a detailed description of non-restrictive embodiments with reference to the drawings.

DETAILED DESCRIPTION

Figure 1:
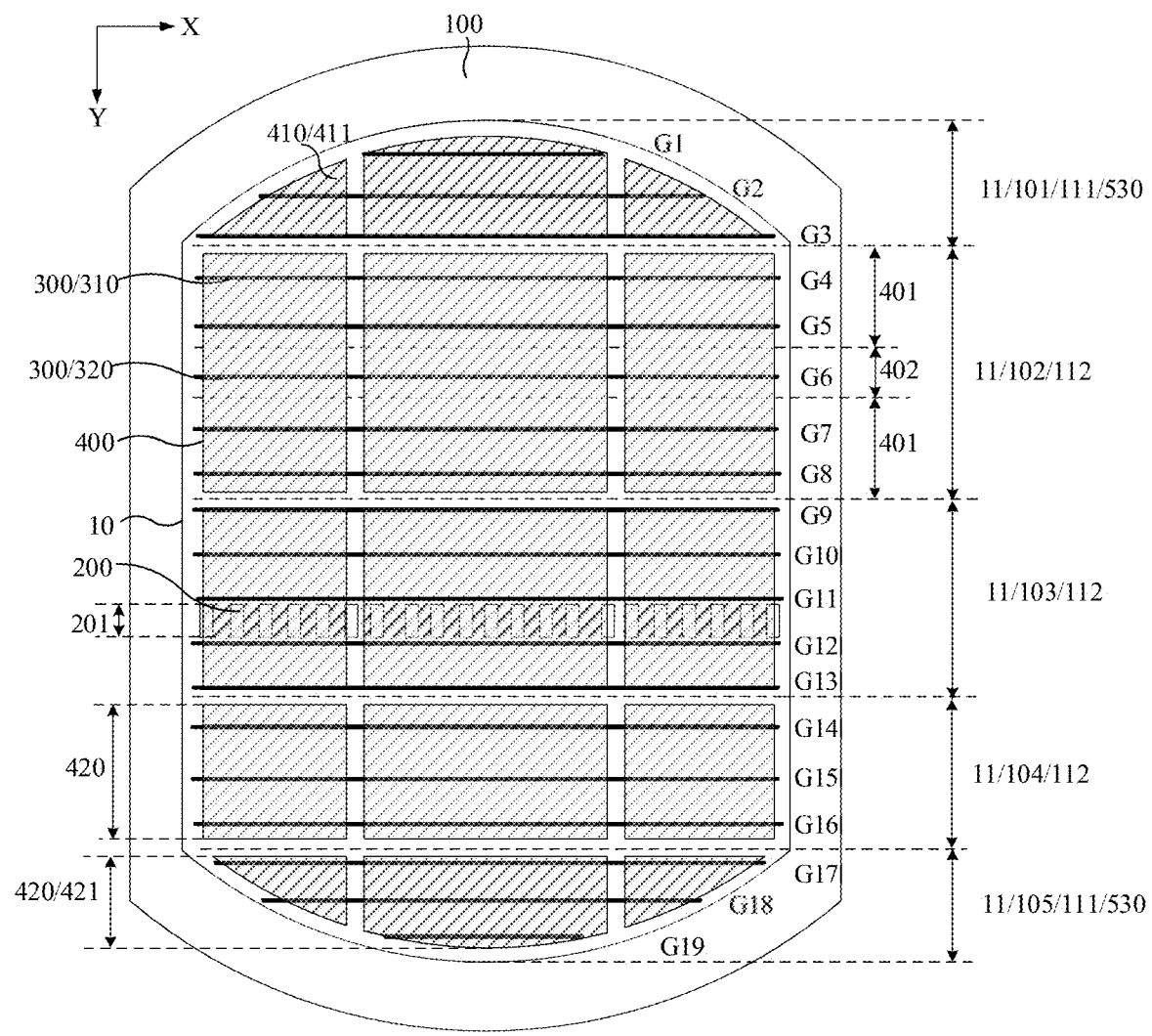
FIG. 1 is a structure diagram of a touch display screen according to an embodiment of the present disclosure.

To elucidate technical means and technical effects for achieving an intended purpose of the present disclosure, embodiments, structures, features and effects of a touch display screen and a driving method of thereof according to the present disclosure are described hereinafter in detail with reference to accompanying drawings and preferred embodiments.

A driving method of a touch display screen is provided in the embodiments of the present disclosure. The touch display screen includes a substrate, multiple pixels, multiple scanning lines and a touch electrode layer. The multiple scanning lines extend along a first direction and are arranged or one side of the substrate in a second direction, the multiple pixels are arranged as multiple pixel rows extending along the first direction, and pixels in each pixel row ore electrically connected to at least one of the multiple scanning lines. The touch electrode layer at least partially overlaps the multiple scanning lines in a direction perpendicular to a plane where the substrate is located. The touch electrode layer includes multiple touch electrode rows formed by multiple touch electrodes, the multiple touch electrodes include a special-shaped touch electrode, the multiple touch electrode rows include a special-shaped touch electrode row, the special-shaped touch electrode row includes the special-shaped touch electrode, and the multiple touch electrode rows extend along the first direction.

The touch display screen includes a display region, the display region includes multiple sub-display regions arranged in the second direction, and the multiple sub-display regions are in one-to-one correspondence with the multiple touch electrode rows and each sub-display region overlaps a respective one of the multiple touch electrode rows. The multiple sub-display regions include at least one special-shaped sub-display region, and the at least one special-shaped sub-display region corresponds to the special-shaped touch electrode row. In the multiple sub-display regions, the multiple scanning lines include first scanning lines and second scanning lines. The multiple first scanning lines overlap edge regions of the multiple touch electrode rows along the second direction, and the multiple second scanning lines overlap center regions of the multiple touch electrode rows along the second direction.

The driving method of the touch display screen includes that: one frame cycle includes at least one touch control stage, the at least one touch control stage is staggered from scanning stages of pixel rows electrically connected to at least one of the first scanning lines and overlaps scanning stages of pixel rows electrically connected to at least one of the second scanning lines.

In the driving method of the touch display screen provided in the embodiments of the present disclosure, the touch control stage within one frame cycle is staggered from the scanning stage of the pixel row electrically connected to at least one of the first scanning lines and overlaps the scanning stage of the pixel row electrically connected to at least one of the second scanning lines. The first scanning lines overlap the edge regions of the multiple touch electrode rows along the second direction, and the multiple second scanning lines overlap the center regions of the multiple touch electrode rows along the second direction. Compared to the center regions of the multiple touch electrode rows, the touch performance of the edge regions of the multiple touch electrode rows is poor, and changing electrical signals on signal lines overlapping the edge regions have a greater interference on the touch performance of the touch electrodes. The above scheme can reduce the influence of the changing electrical signals on the signal lines overlapping the edge regions on the touch performance of the touch electrodes and improve the touch performance of the touch display screen.

The preceding is the core idea of the present application. Technical schemes in embodiments of the present disclosure are described clearly and completely below in conjunction with the drawings in the embodiments of the present disclosure. Apparently, the embodiments described below are part, not all, of the embodiments of the present disclosure. Based on the embodiments of the present disclosure, all other embodiments obtained by those of ordinary skill in the art without creative work are within the scope of the present disclosure.

Details are set forth below to facilitate a thorough understanding of the present disclosure. However, the present disclosure may be implemented by other embodiments different from the embodiments described herein, and those skilled in the art may make similar generalizations without departing from the intention of the present disclosure. Therefore, the present disclosure is not limited to the embodiments below.

Additionally, the present disclosure is described in detail in conjunction with the drawings. In the detailed description of embodiments of the present disclosure, for case of description, schematic views illustrating structures of devices and components are not partially enlarged to a general proportional scale. The schematic views are merely illustrative and are not intended to limit the scope of the present disclosure. Additionally, actual manufacturing includes three-dimensional spatial sizes: length, width and height.

The embodiments of the present disclosure provide a driving method of a touch display screen. The driving method of the touch display screen is used for driving the touch display screen shown in the FIG. 1. As shown in FIG. 1, the touch display screen includes a substrate 100, multiple pixels 200, multiple scanning lines 300 and a touch electrode layer 400. The multiple scanning lines 300 extend along a first direction X and are arranged on one side of the substrate 100 in a second direction Y, the multiple pixels 200 are arranged as multiple pixel rows 201 extending along the first direction X and pixels 200 in each pixel row 201 are electrically connected to at least one scanning line 300. It is to be noted that in order to simplify drawings, merely one pixel row 201 is illustrated in FIG. 1, and it can be understood that the touch display screen also includes other pixel rows 201. With continued reference so FIG. 1, the touch electrode layer 400 at least partially overlaps the multiple scanning lines 300 in a direction perpendicular to 3 plane where the substrate 100 is located. The touch electrode layer 400 includes multiple touch electrode rows 420 formed by multiple touch electrodes 410, the multiple touch electrodes 410 include a special-shaped touch electrode 411, the multiple touch electrode rows 420 includes a special-shaped touch electrode row 421, the special-shaped touch electrode row 421 includes the special-shaped touch electrode 411, and the multiple touch electrode rows 420 extend along the first direction X.

The touch display screen includes a display region 10, the display region 10 includes multiple sub-display regions 11 arranged in the second direction Y, and the multiple sub-display regions 11 are in one-to-one correspondence with the multiple touch electrode rows 420 and each sub display region 11 overlaps a respective one touch electrode row 420. The multiple sub-display regions 11 include at least one special-shaped sub-display region 111, and the at least one special-shaped sub-display region 111 corresponds to the special-shaped touch electrode row 421. In the multiple sub-display regions 11, the multiple scanning lines 300 include first scanning lines 310 and second scanning lines 320. The first scanning lines 310 overlap edge regions 401 of the multiple touch electrode rows 420 in the second direction Y, and the second scanning lines overlap center regions 402 of the multiple touch electrode rows 420 in the second direction Y.

Figure 2:
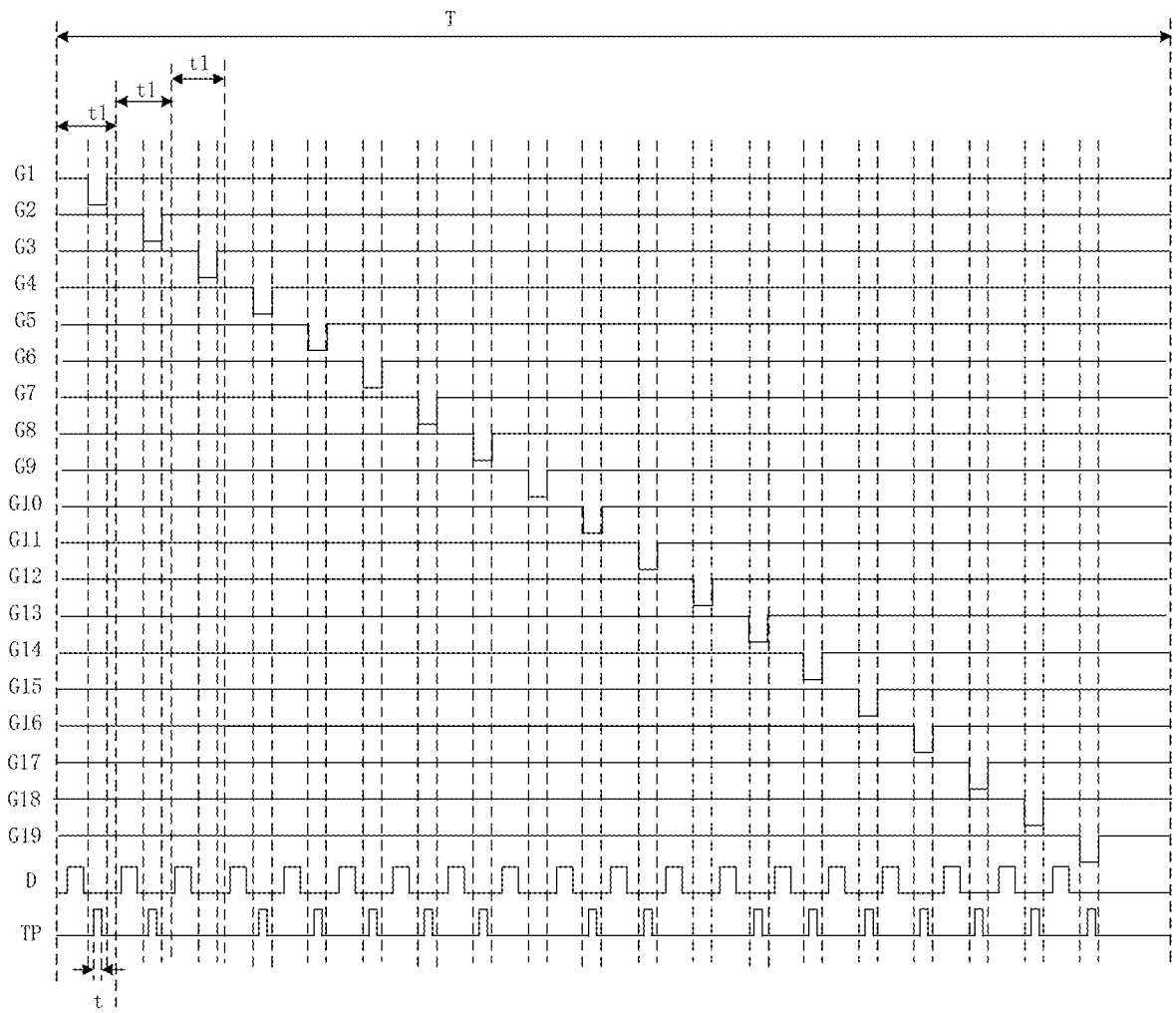
FIG. 2 is a timing diagram of a touch display screen according to an embodiment of the present disclosure.

FIG. 2 is a timing diagram of a touch display screen according to an embodiment of the present disclosure. FIG. 2 is a timing diagram for driving the touch display screen shown in FIG. 1 by using the driving method of the touch display screen provided by the embodiments of the present disclosure. FIG. 1 includes five sub-display regions 11, which are 101, 102, 103, 104 and 105, and 19 scanning lines 300, which are G1 to G19. G2 is a second scanning line 320 in a sub-display region 101, while G1 and G3 are first scanning lines 310 in the sub-display region 101. G6 is a second scanning line 320 in a sub-display region 102, while G4, G5, G7 and G8 are first scanning lines 310 in the sub-display region 102. G11 is a second scanning line 320 in a sub display region 103, while G9, G10, G12 and G13 are first scanning lines 310 in the sub-display region 103. G15 is a second scanning line 320 in a sub-display region 104, while G14 and G16 are first scanning lines 310 in the sub-display region 104. G18 is a second scanning line 320 in a sub-display region 105, while G17 and G19 are first scanning lines 310 in the sub-display region 105. It is to be noted that FIG. 1 is only illustrative and not limited to the ease where the center region 402 of the pixel row 201 includes one second scanning line 320. In other implementation modes of the present embodiment, the second scanning line 320 in the center region 402 may also have other numbers. Reasonable settings are made according to the structure of the touch display screen, which are not limited in this embodiment. As shown in FIG. 2, one frame cycle T includes at least one touch control stage t, the at least one touch control stage t is staggered from a scanning stage t1 of a pixel row electrically connected to at least one first scanning line and overlaps a scanning stage t1 of a pixel row electrically connected to at least one second scanning line.

One frame cycle T represents a time period required for generating or transmitting one frame of picture data, the touch control stage t represents a stage in which touch control signals are applied to the touch electrodes, and a scanning stage t1 includes an initialization stage and a data write stage. FIG. 2 illustrates scanning stages t1 of pixel rows electrically connected to G1, G2 and G3. In addition, "be staggered from" refers to that wo stages have a time sequential order and no time period for parallel implementation, and "overlap" refers to that two stages have a time period for parallel implementation.

It is to be noted that the touch display screen may be, for example, an organic light-emitting touch display screen or the like. The present embodiment does not limit the structure of the touch display screen, and all display screens with the touch function are within the scope of the present embodiment. It can be understood that based on different structures of the touch display screen, the number of scanning lines to which the pixel rows are electrically connected is different.

Exemplarily, for the organic light-emitting touch display screen, each pixel row is electrically connected to two scanning lines.

It is also to be noted that the touch display screen having a rectangular shape of the display region is a conventional touch display screen, the touch display screen having a non-rectangular shape of the display region is a special-shaped touch display screen, and the display region of the special-shaped touch display screen includes a special-shaped edge, i.e., an edge having a shape different from a corresponding edge of the conventional touch display screen. Exemplarily, any straight line edge of the rectangular display region is changed into an arcuate edge, in this case, the shape of the display region is non-rectangular, the touch display screen where this display region is located is the special-shaped touch display screen, and the arcuate edge is the special-shaped edge of the display region. In order to adapt to the special-shaped edge of the display region, the shape of touch electrodes located at the special-shaped edge in the display region needs to be adaptively adjusted, and the adjusted touch electrodes are special-shaped touch electrodes, where the special-shaped touch electrodes have the same special-shaped edge shape as the special-shaped edge of the display region.

In addition, the present embodiment divides the display region into multiple sub-display regions based on the touch electrode rows, each sub-display region includes and merely includes one touch electrode row, where the special-shaped sub-display region has an internal touch electrode row including one or more special-shaped touch electrodes.

It is to be that sizes of touch electrodes in different touch electrode rows may be the same or different, while distances between adjacent scanning lines are generally equal, so the numbers of scanning lines overlapping different touch electrode rows may be equal or unequal, which is not limited to the unequal case shown in FIG. 1.

In the present embodiment, the touch electrode row includes a center region and two edge regions; in the second direction, the center region is located at the central position of the touch electrode row, and the two edge regions are located on opposite sides of the center region. The touch performance in the center region is relatively good, and the touch performance of the edge regions is relatively poor, so that the influence of the interference signals on the touch control signals in the edge regions is more obvious. The interference signals include changing electrical signals on the signal lines overlapping the touch electrodes, for example, changing scanning signals on the scanning lines (G1 to G16 in FIG. 2), changing data signals on the data line (D in FIG. 2) and the like, all these signals are generated during the scanning stages of pixel rows.

In the multiple scanning lines, the first scanning lines overlap the edge regions of the touch electrode rows, electrical signals changing in scanning stages of pixel rows electrically connected to the first scanning lines have a greater influence on touch control signals in the touch control stage. The second scanning lines overlap the center regions of the touch electrode rows, compared to the first scanning lines, the electrical signals changing in scanning stages of pixel rows electrically connected to the second scanning lines have a smaller influence on the touch control signals in the touch control stage. In one frame cycle, the touch control stage is set to be staggered from the scanning stage of the pixel row electrically connected to at least one first scanning line and overlap the scanning stage of the pixel row electrically connected to at least one second scanning line, so us to reduce the influence of the electrical signals changing in the scanning stages of the pixel rows on the touch control signals in the touch control stage, and improve the touch performance of the touch display screen.

Figure 3:
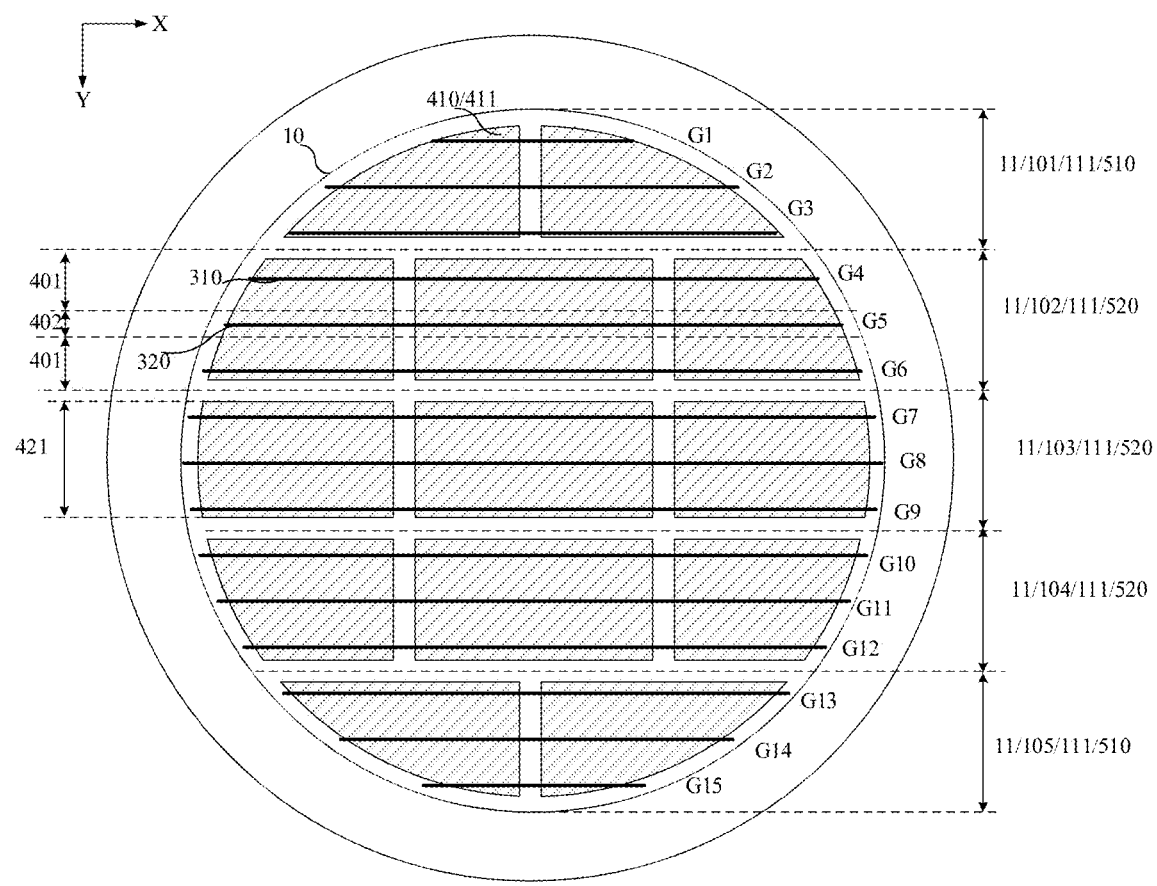
FIG. 3 is a structure diagram of another touch display screen according to an embodiment of the present disclosure.

FIG. 3 is a structure diagram of another touch display screen according to an embodiment of the present disclosure. It is to be noted that in order to simplify the structure of the drawings, subsequent drawings do not illustrate the pixels and the pixels row. As shown in FIG. 3, the special-shaped sub-display region 111 includes two first special-shaped sub-display regions 510 and multiple second special-shaped sub-display regions 520, and along the second direction Y, the two first special-shaped sub-display regions 510 are located on opposite sides of the multiple second special-shaped sub-display regions 520.

In the two first special-shaped sub-display regions 510, the special-shaped touch electrode row 421 includes m special-shaped touch electrodes 411, where m≥2 and m is an integer. In the multiple second special-shaped sub-display regions 520, the special-shaped touch electrode row 421 includes n special-shaped touch electrodes 411, where n is a positive integer, and n<m.

Figure 4:
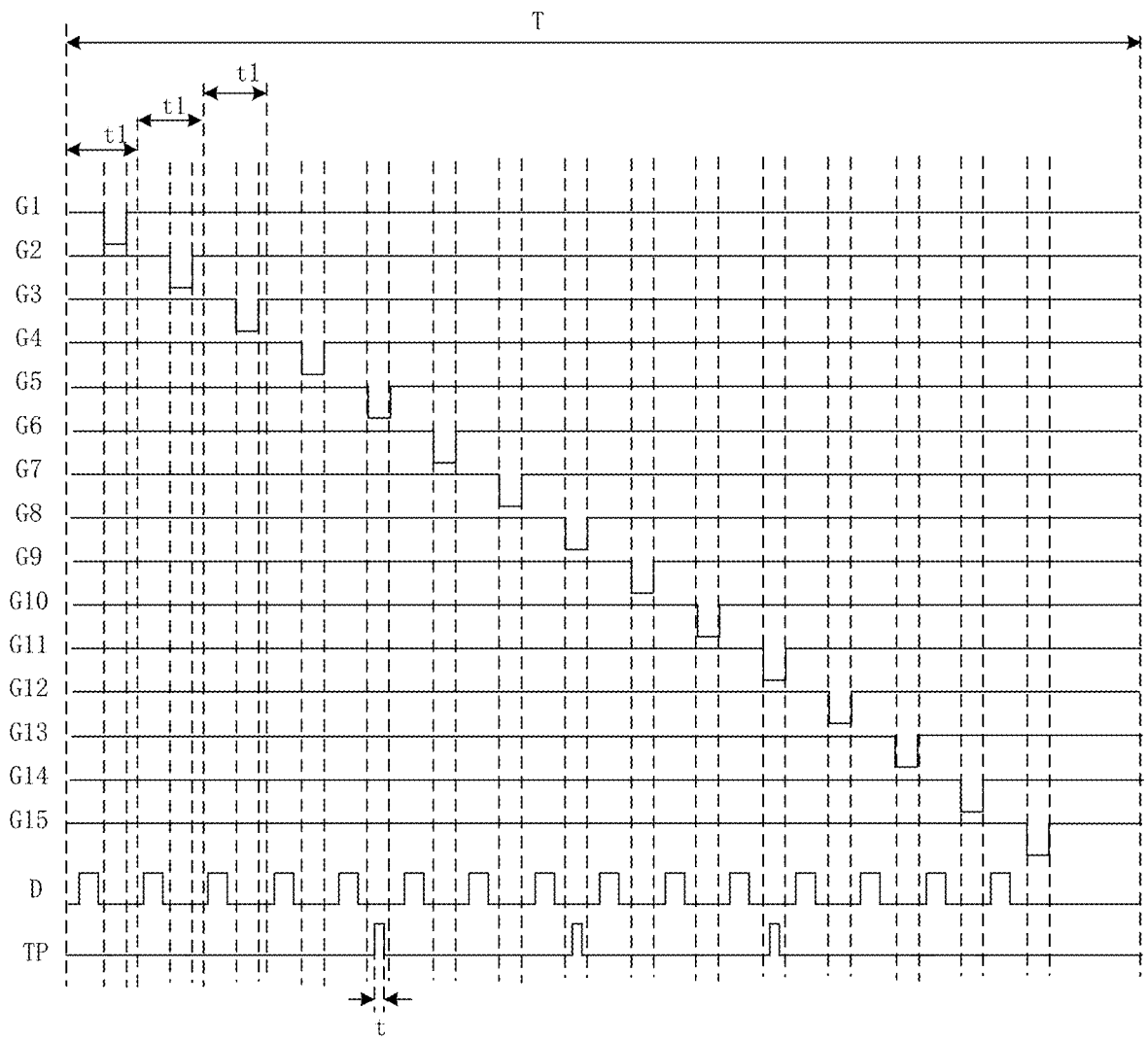
FIG. 4 is a timing diagram of a touch display screen according to an embodiment of the present disclosure.

FIG. 4 is a timing diagram of a touch display screen according to an embodiment of the present disclosure. FIG. 4 is a liming diagram for driving the touch display screen shown in FIG. 3 by using the driving method of the touch display screen provided by the embodiments of the present disclosure. FIG. 3 includes five sub-display regions 11, which are 101, 102, 103, 104 and 105, and 15 scanning lines 300, which are G1 to G15. G2 is a second scanning line 320 in a sub display region 101, while G1 and G3 are first scanning lines 310 in the sub-display region 101. G5 is a second scanning line 320 in a sub-display region 102, while G4 and G6 are first scanning lines 310 in the sub-display region 102. G8 is a second scanning line 320 in a sub-display region 103, while G7 and G9 are first scanning lines 310 in the sub-display region 103. G11 is a second scanning line 320 in a sub-display region 104, while G10 and G12 are first scanning lines 310 in the sub-display region 104. G14 is a second scanning line 320 in a sub-display region 105, while G13 and G15 are first scanning lines 310 in the sub-display region 105. It is to be noted that FIG. 3 is only illustrative and not limited to the case where the center region 402 of the pixel row 201 includes one second scanning line 320. In other implementation modes of the present embodiment, the second scanning lines 320 in the center region 402 may further include other numbers. Reasonable settings are made according to the structure of the touch display screen, which is not limited to this embodiment. As shown in FIG. 4, in the first special-shaped sub-display regions 510, the touch control stage t is staggered from scanning stages t1 of pixel rows electrically connected to first scanning lines and scanning stages t1 of pixel rows electrically connected to second scanning lines; and in the second special-shaped sub-display regions 520, the touch control stage t is staggered from scanning stages t1 of pixel rows electrically connected to first scanning lines and overlaps scanning stages t1 of pixel rows electrically connected to second scanning lines.

It is to be noted that the number of special-shaped touch electrodes in the first special-shaped sub-display regions is greater than the number of special-shaped touch electrodes in the second special-shaped sub-display regions, which represents that the special-shaped degree of the first special-shaped sub-display regions is greater than the special-shaped degree of the second special-shaped sub-display regions. Furthermore, an influence A of changing electrical signals on signal lines overlapping the special-shaped touch electrode rows in the first special-shaped sub-display regions is relatively large, and an influence B of the changing electrical signals on signal lines overlapping the special-shaped touch electrode row in the second special-shaped sub-display regions is relatively small. Moreover, the changing electrical signals on the signal lines overlapping the edge regions of the touch electrode rows have a relatively great influence B1 on the touch control signals. The changing electrical signals on the signal lines overlapping the center regions of the touch electrode rows have a relatively small influence B2 on the touch control signals. Therefore, the following relationship exists: A> B1> B2, as it can be seen that the changing electrical signals in the scanning stages of the pixel rows electrically connected to the second scanning lines in the second special-shaped sub-display regions have the least influence on the touch control signals. The timing setting manner in the present embodiment enables the touch control stages to avoid scanning stages of pixel rows having the larger influence on the touch control signals, thereby preventing the changing electrical signals in the scanning stages front affecting the touch control signals, and further improving the touch performance of the touch display screen.

Figure 5:
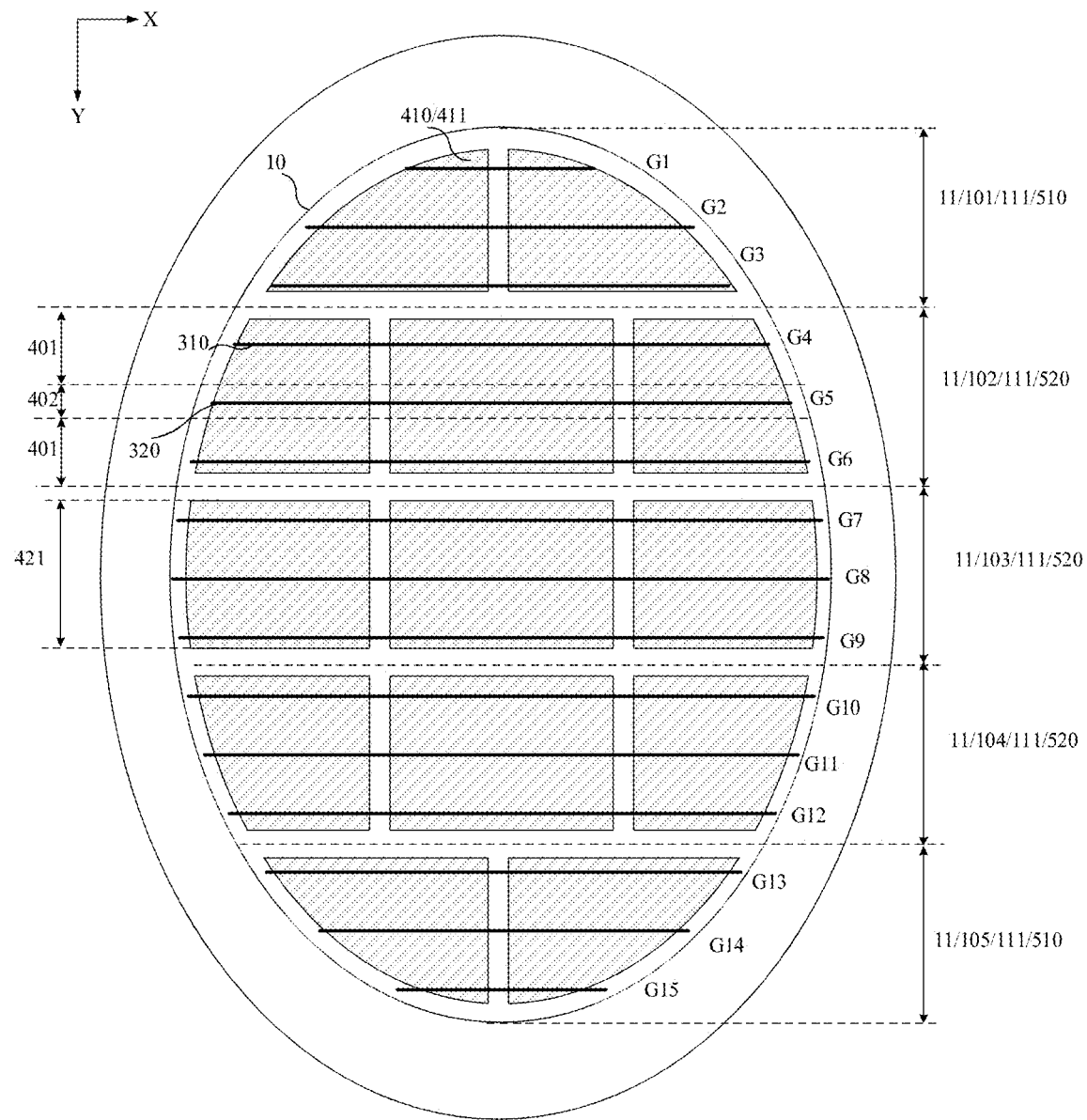
FIG. 5 is a structure diagram of another touch display screen according to an embodiment of the present disclosure.

Exemplarily, the display region 11 is circular. In other embodiments of the present embodiment, the display region 11 may be, for example, oval as shown in FIG. 5.

Figure 6:
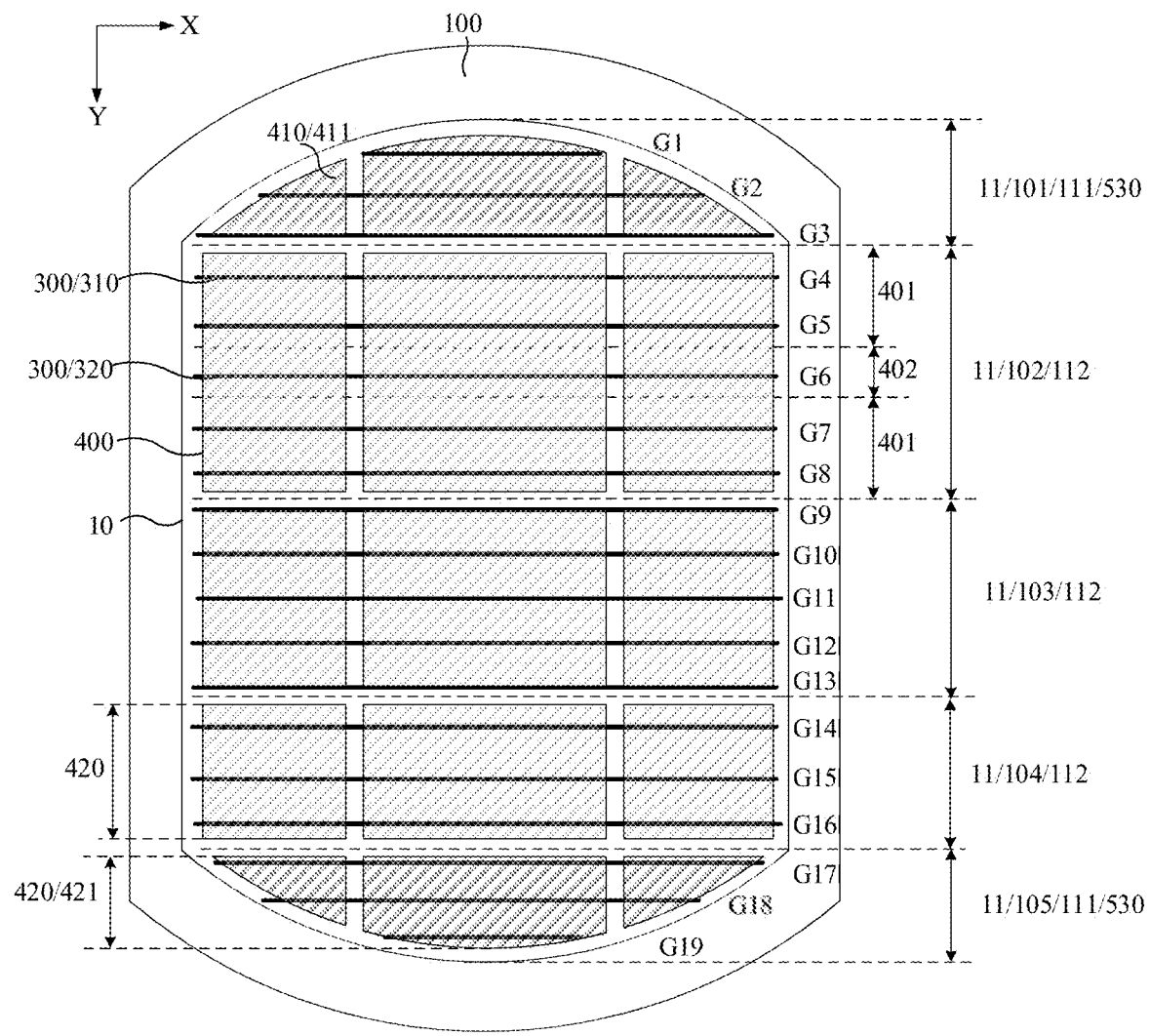
FIG. 6 is a structure diagram of another touch display screen according to an embodiment of the present disclosure.

FIG. 6 is a structure diagram of another touch display screen according to an embodiment of the present disclosure. It can be understood that FIG. 6 is a structure diagram of FIG. 1 after the pixels are simplified. The touch display screens in FIG. 6 and FIG. 1 have the same actual structure. As shown in FIG. 6, the special shaped sub-display region 111 includes two third special-shaped display regions 530, and the multiple sub-display regions 11 include multiple first normal sub-display regions 113, and along the second direction, the two third special-shaped display regions 530 are located on opposite sides of the multiple first normal sub-display regions 112.

The normal sub-display regions are sub-display regions in which all touch electrodes 410 are not special-shaped touch electrodes.

Figure 7:
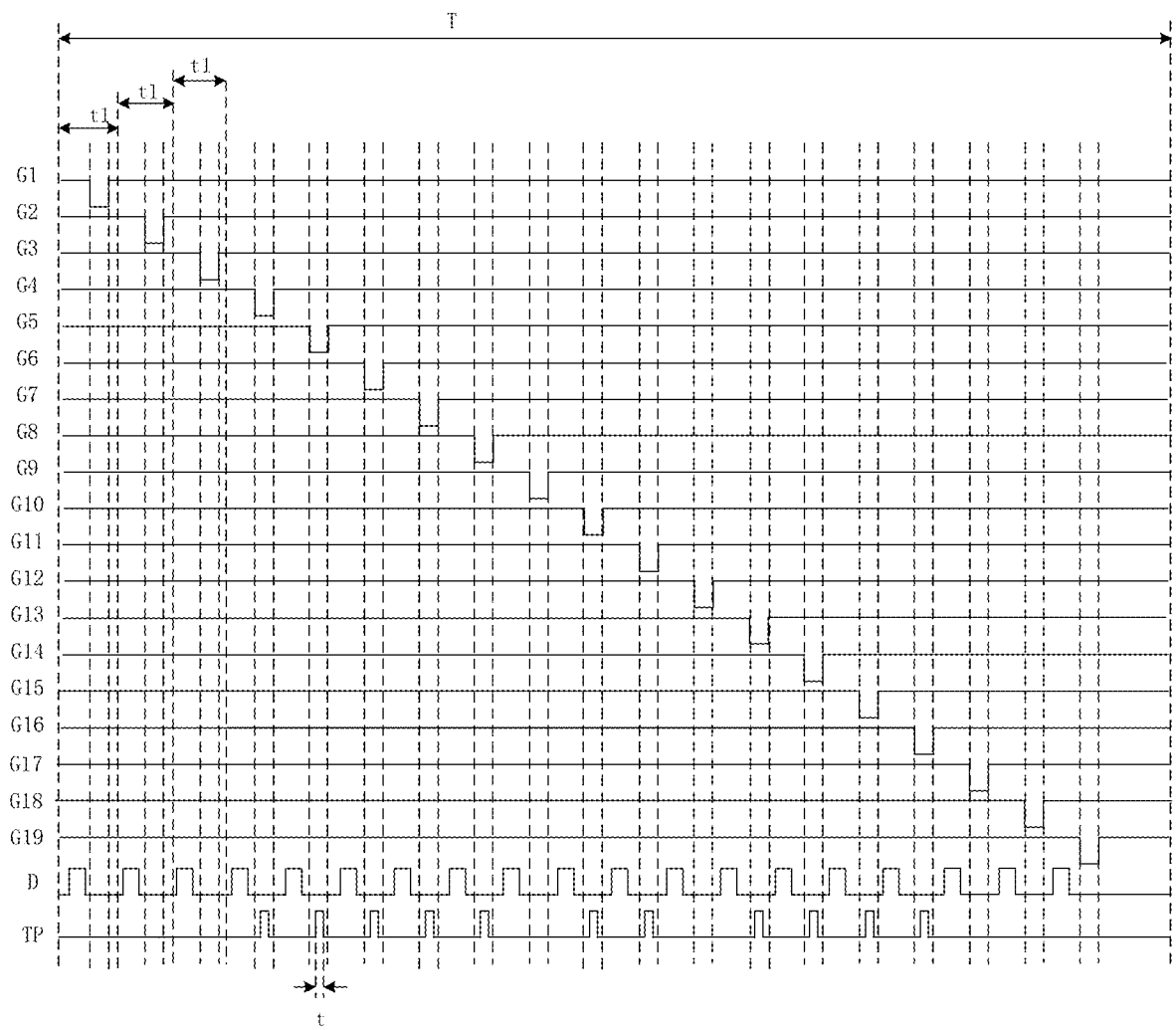
FIG. 7 is a timing diagram of another touch display screen according to an embodiment of the present disclosure.

FIG. 7 is a timing diagram of another touch display screen according to an embodiment of the present disclosure. FIG. 7 is a timing diagram for driving the touch display screen shown in FIG. 6 (FIG. 1) by using the driving method of the touch display screen provided by the embodiments of the present disclosure. As shown in FIG. 7, in the third special-shaped sub-display regions, the touch control stage t is staggered from scanning stages t1 of pixel rows electrically connected to first scanning lines and scanning stages t1 of pixel rows electrically connected to second scanning lines.

It is to be noted that the third special-shaped sub-display regions include multiple special-shaped touch electrodes, the special-shaped touch electrodes have smaller areas than other touch electrodes, and the touch performance of the special-shaped touch electrodes is relatively poor. At this time, coupling capacitances between the special-shaped touch electrodes and the signal lines overlapping the special-shaped touch electrodes have a greater influence on the touch performance, resulting in a relatively poor touch performance of the third special-shaped sub-display regions. In the present embodiment, in the third special-shaped sub-display regions, the touch control stage is staggered from the scanning stages of pixel rows electrically connected to the first scanning lines and scanning stages t1 of pixel rows electrically connected to the second scanning lines so that when touch control signals are applied to the touch electrodes, there is no changing electrical signal on the signal lines overlapping the third special-shaped sub-display regions, and the touch performance is prevented from being affected by the changing electrical signals on the signal lines.

Figure 8:
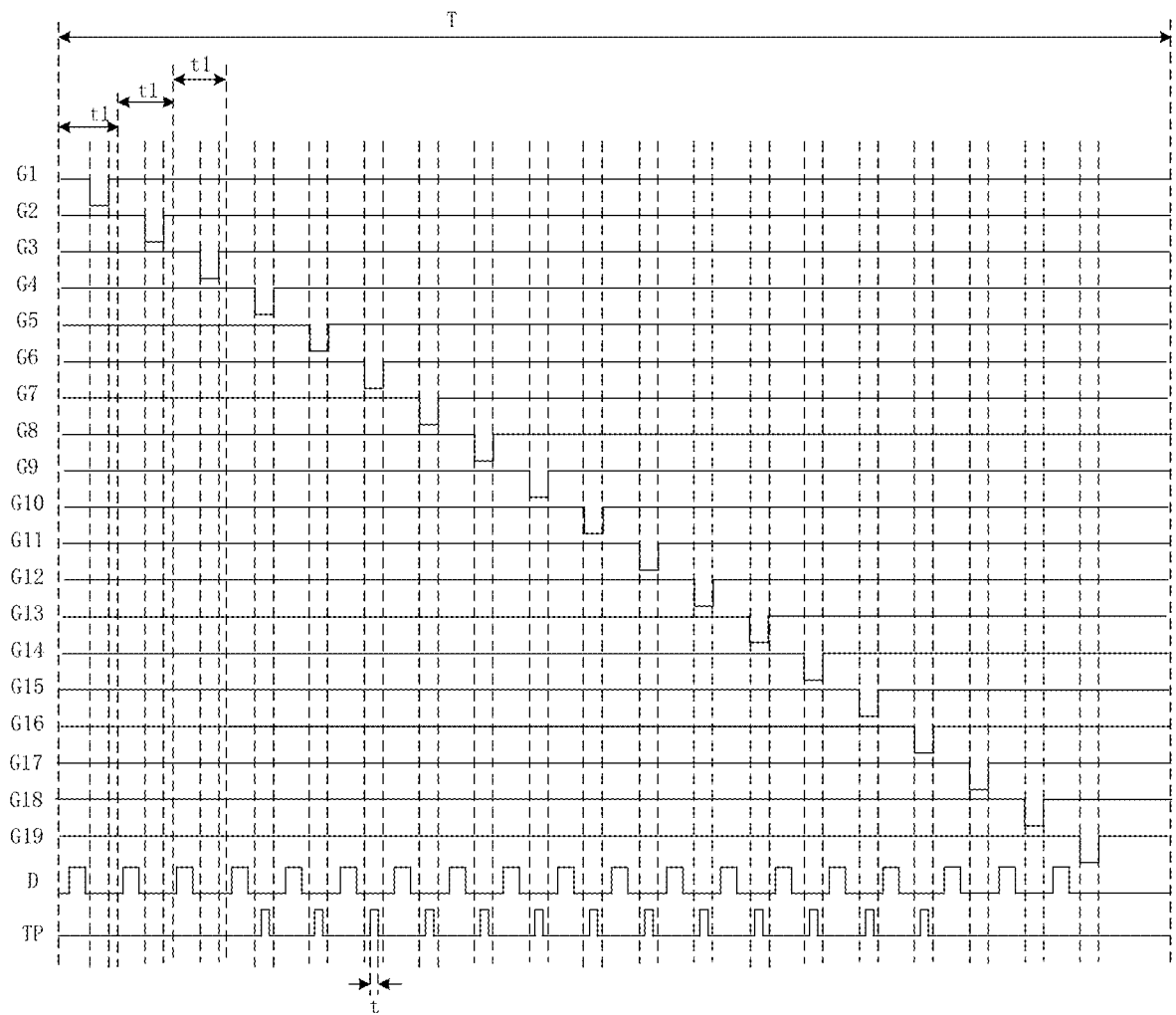
FIG. 8 is a liming diagram of another touch display screen according to an embodiment of the present disclosure.

FIG. 8 is a timing diagram of another touch display screen according to an embodiment of the present disclosure. FIG. 8 is a timing diagram for driving the touch display screen shown in FIG. 6 (FIG. 1) by using the driving method of the touch display screen provided by the embodiments of the present disclosure. As shown in FIG. 8, based on FIG. 7, in the first normal sub-display regions, the touch control stage t1 overlaps both scanning stages t1 of pixel rows electrically connected to the first scanning lines and scanning stages t1 of pixel rows electrically connected to the second scanning lines.

It is to be noted that the touch electrodes in the first normal sub-display regions are non-special-shaped touch electrodes, these non-special-shaped touch electrodes have relatively large areas. Compared with the special-shaped touch electrodes, the intensity of touch control signals generated by the non-special-shaped touch electrodes is greater, and the changing electrical signals on the signal lines overlapping the non-special-shaped touch electrodes have a smaller influence on the touch performance. Therefore, in the first normal sub-display regions, the touch control stage is set to overlap both the scanning stages of pixel rows electrically connected to the first scanning lines and the scanning stages of pixel rows electrically connected to the second scanning lines, when the touch control signals are applied to the touch electrodes, there is no changing electrical signal on the signal lines which have the larger influence on the performance of the touch electrodes, and the changing electrical signals merely appear on the signal lines which have the relatively small influence on the touch electrodes, which is beneficial to improving the touch performance of the touch display screen.

Figure 9:
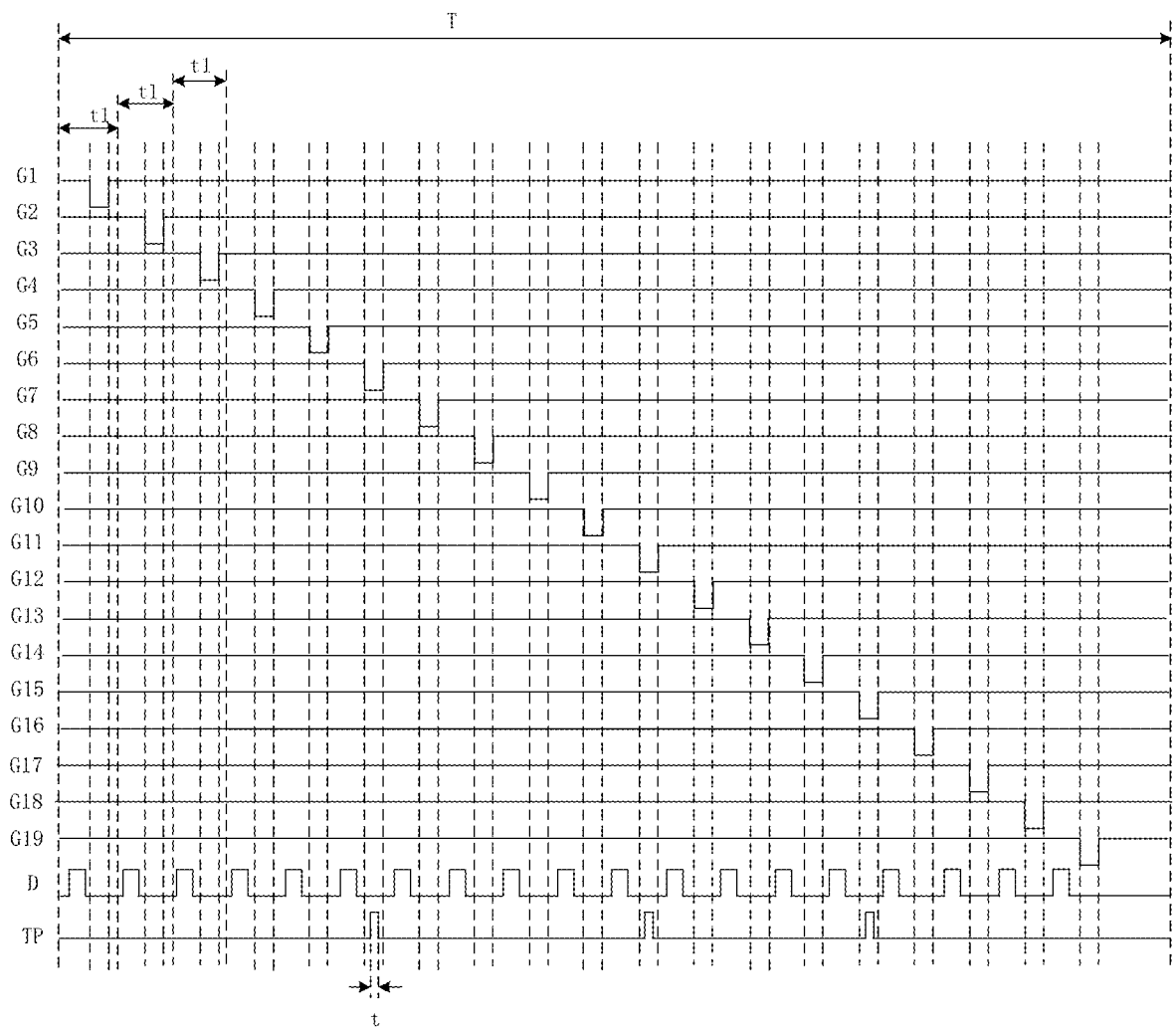
FIG. 9 is a timing diagram of another touch display screen according to an embodiment of the present disclosure.

FIG. 9 is a timing diagram of another touch display screen according to an embodiment of the present disclosure. FIG. 9 is a timing diagram for driving the touch display screen shown in FIG. 6 (FIG. 1) by using the driving method of the touch display screen provided by the embodiments of the present disclosure. As shown in FIG. 9, based on FIG. 7, in the first normal sub-display regions, the touch control stage t is staggered from scanning stages t1 of pixel rows electrically connected to the first scanning lines and overlaps scanning stages t1 of pixel rows electrically connected to the second scanning lines.

It is to be noted that the edge regions in the touch electrode rows have relatively poor touch performance. The changing electrical signals on the signal lines overlapping the edge regions of the touch electrode rows have a greater influence on the touch performance of the touch electrodes. While the center regions have relatively good touch performance, and the changing electrical signals on the signal lines overlapping the center regions of the touch electrode rows have a smaller influence on the touch performance of the touch electrodes. The touch control stage is set to be staggered from the scanning stages of pixel rows electrically connected to the first scanning lines and overlap the scanning stages of pixel rows electrically connected to the second scanning lines, further reducing the influence of the changing electrical signals on the signal lines overlapping the touch electrodes on the touch performance, and being beneficial to further improving the touch performance of the touch display screen.

With continued reference to FIG. 6, the display region 10 has a shape of a quadrilateral, the quadrilateral includes two opposite straight sides parallel to each other and two opposite arcuate sides respectively projecting toward a side away from a geometric center of the quadrilateral.

It is to be noted that compared with the rectangular display region, the shape of the display region shown in FIG. 6 may increase the area of the display region by changing a right angle side to an arcuate side without increasing the width of the display region.

Figure 10:
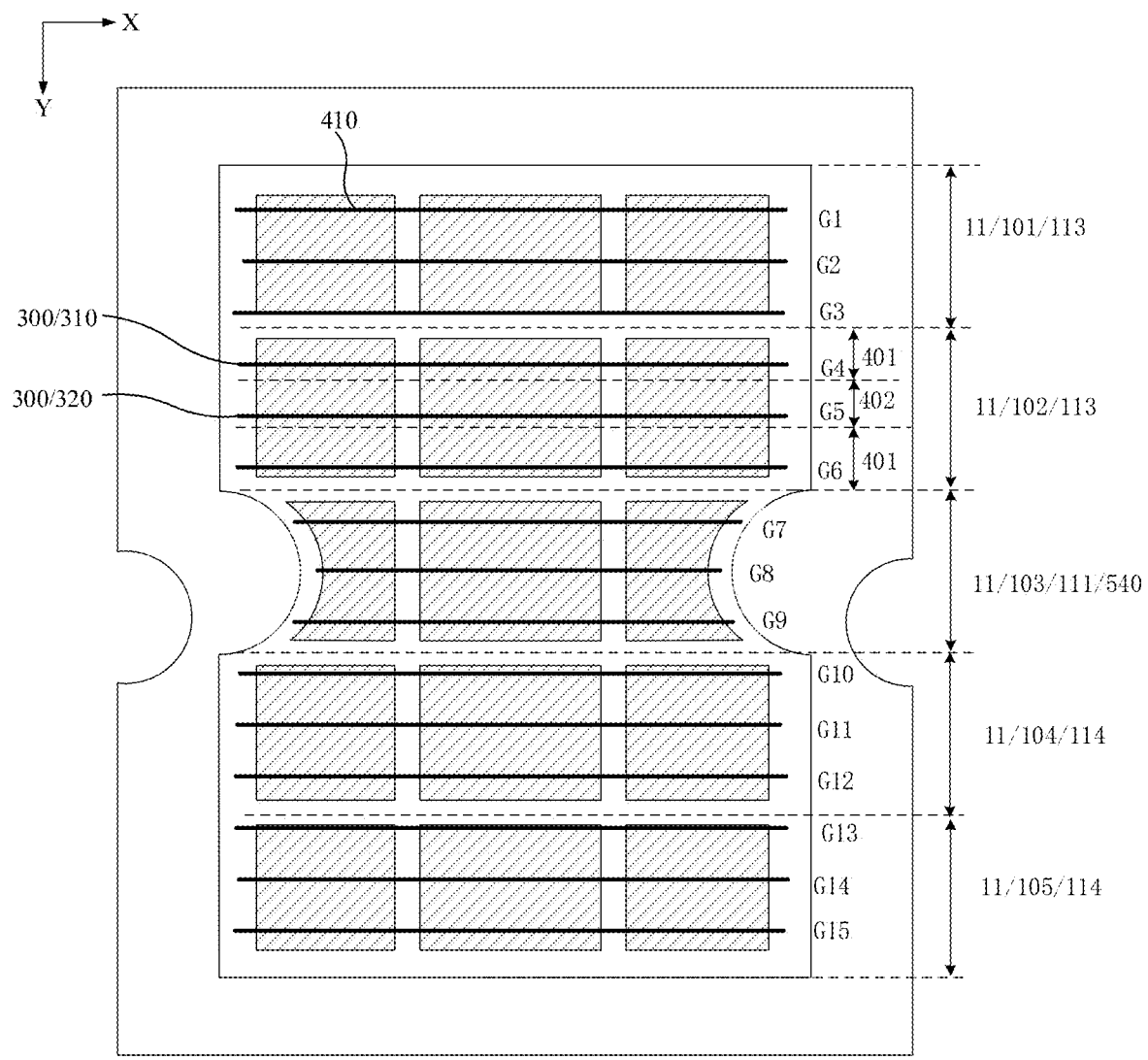
FIG. 10 is a structure diagram of another touch display screen according to an embodiment of the present disclosure.

FIG. 10 is a structure diagram of another touch display screen according to an embodiment of the present disclosure. As shown in FIG. 10, the special-shaped sub-display region 111 includes at least one fourth special-shaped sub-display region 540, and the multiple sub-display regions 11 include multiple second normal sub-display regions 113 and multiple third normal sub-display regions 114. Along the second direction, the multiple second normal sub-display regions 113 are located on a first side of the at least one fourth special-shaped sub-display region 540 and the multiple third normal sub-display regions 114 are located on a second side of the at least one fourth special-shaped sub-display region 540.

Figure 11:
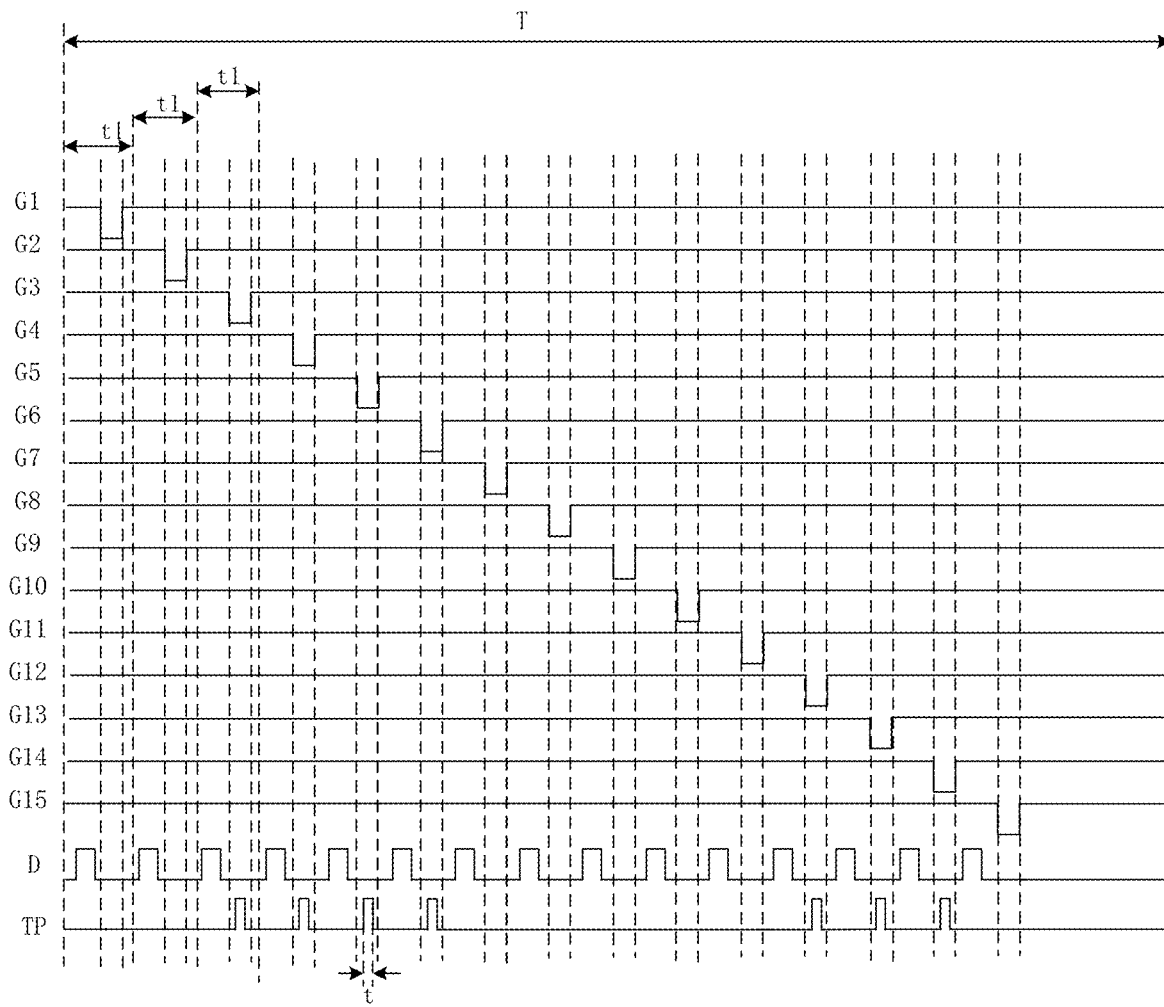
FIG. 11 is a timing diagram of a touch display screen according to an embodiment of the present disclosure.

FIG. 11 is a timing diagram of a touch display screen according to an embodiment of the present disclosure. FIG. 11 is a timing diagram for driving the touch display screen shown in FIG. 10 by using the driving method of the touch display screen provided by the embodiments of the present disclosure. FIG. 10 includes five sub-display regions 11, which are 101, 102, 103, 104 and 105, and 15 scanning lines 300, which are G1 to G15. G2 is a second scanning line 320 in a sub-display region 101, while G1 and G3 are first scanning lines 310 in the sub display region 101. G5 is a second scanning line 320 in a sub-display region 102, while G4 and G6 are first scanning lines 310 in the sub-display region 102. G8 is a second scanning line 320 in a sub-display region 103, while G7 and G9 are first scanning lines 310 in the sub-display region 103. G11 is a second scanning line 320 in a sub-display region 104, while G10 and G12 are first scanning lines 310 in the sub-display region 104. G14 is a second scanning line 320 in a sub-display region 105, while G13 and G15 are first scanning lines 310 in the sub-display region 105. It is to be noted that FIG. 10 is only illustrative and not limited to the case where the center region 402 of the pixel row 201 includes one second scanning line 320. In other implementation modes of the present embodiment, the second scanning line 320 in the center region 402 may also have other numbers. Reasonable settings are made according to the structure of the touch display screen, which is not limited to this embodiment. As shown in FIG. 11, in the fourth special-shaped sub-display region, the touch control stage t is staggered from both scanning stages t1 of pixel rows electrically connected to the first scanning lines and scanning stages t1 of pixel rows electrically connected to the second scanning lines.

It is to be noted that the fourth special-shaped sub-display region includes multiple special-shaped touch electrodes, an area of the special-shaped touch electrode is smaller than an area of the normal touch electrode, and the touch performance of the special-shaped touch electrodes is relatively poor. At this time, coupling capacitances between the special-shaped touch electrodes and the signal lines overlapping the special-shaped touch electrodes will have a relatively great influence on the touch performance of the special-shaped touch electrodes, resulting in the relatively poor touch performance in the fourth special-shaped sub-display region. In the present embodiment, in the fourth special-shaped sub-display region, the touch control stage t is set to be staggered from both the scanning stages t1 of pixel rows electrically connected to the first scanning lines and the scanning stages t1 of pixel rows electrically connected to the second scanning lines, therefore, when the touch control signals are applied to the touch electrodes, there is no changing electrical signal on the signal lines overlapping the fourth special-shaped sub-display region, and the touch performance of the touch electrodes is prevented from being affected by the changing electrical signals on the signal lines.

Figure 12:
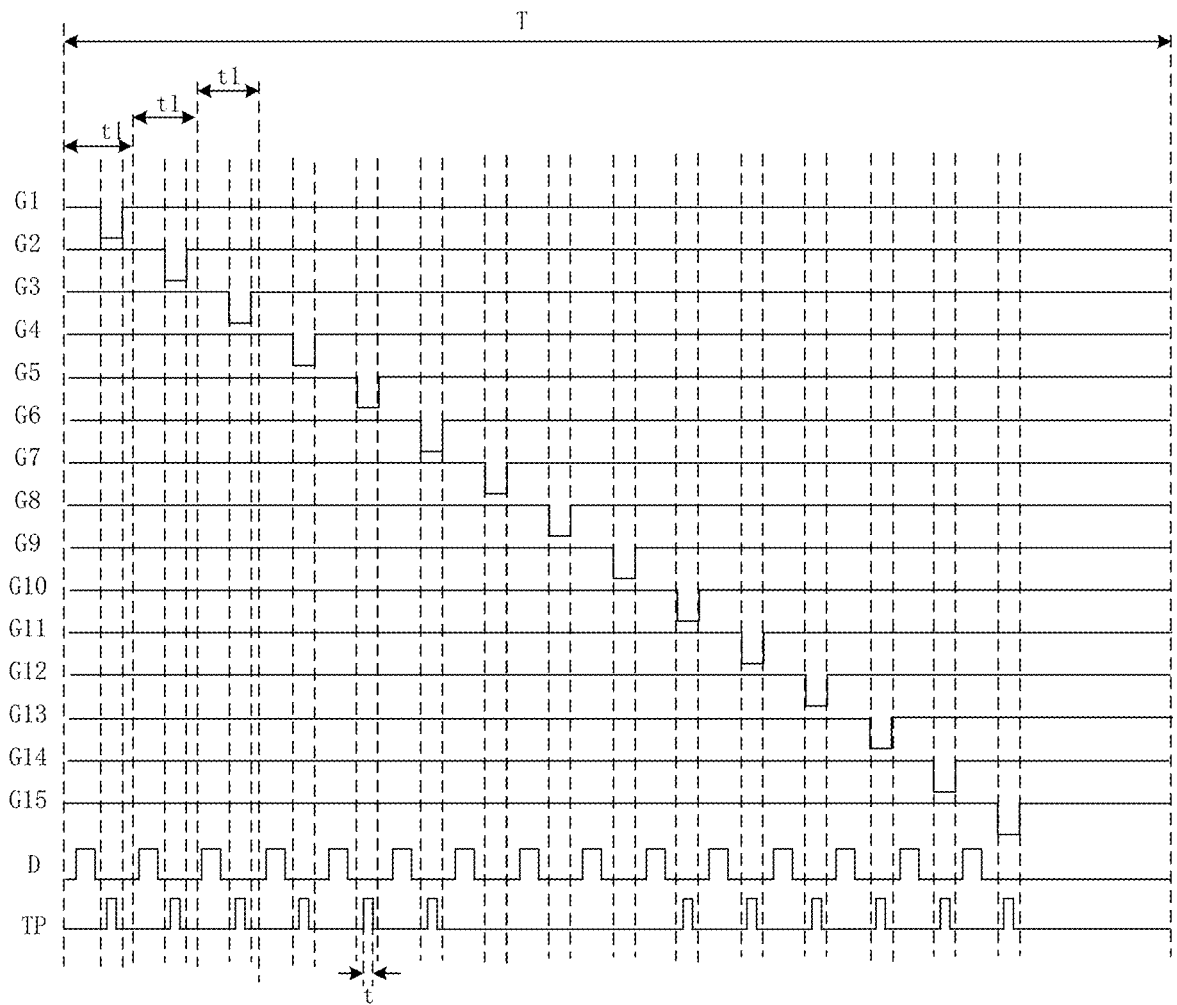
FIG. 12 is a timing diagram of another touch display screen according to an embodiment of the present disclosure.

FIG. 12 is a timing diagram of another touch display screen according to an embodiment of the present disclosure. FIG. 12 is a timing diagram for driving the touch display screen shown in FIG. 11 by using the driving method of the touch display screen provided by the embodiments of the present disclosure. As shown in FIG. 12, bused on FIG. 11, in the second normal sub-display regions and the third normal sub-display regions, the touch control stage overlaps both scanning stages t1 of pixel rows electrically connected to the first scanning lines and scanning stages t1 of pixel rows electrically connected to the second scanning lines.

It is to be noted that, touch electrodes in the second normal sub-display regions and the third normal sub-display regions are normal touch electrodes that have relatively large areas. Compared with the special-shaped touch electrodes, the intensity of touch control signals generated by these normal touch electrodes is greater, and the changing electrical signals on the signal lines overlapping the non-special-shaped touch electrodes have a relatively small influence on the touch performance. Therefore, in the second normal sub-display regions, the touch control stage is set to overlap the scanning stages of pixel rows electrically connected to the first scanning lines and the scanning stages of pixel rows electrically connected to the second scanning lines, when the touch control signals are applied to the touch electrodes, there is no changing electrical signal on the signal lines which have the larger influence on the performance of the touch electrodes, and merely the changing electrical signals appear on the signal lines having the smaller influence on the touch electrodes, which is beneficial to improving the touch performance of the touch display screen.

Figure 13:
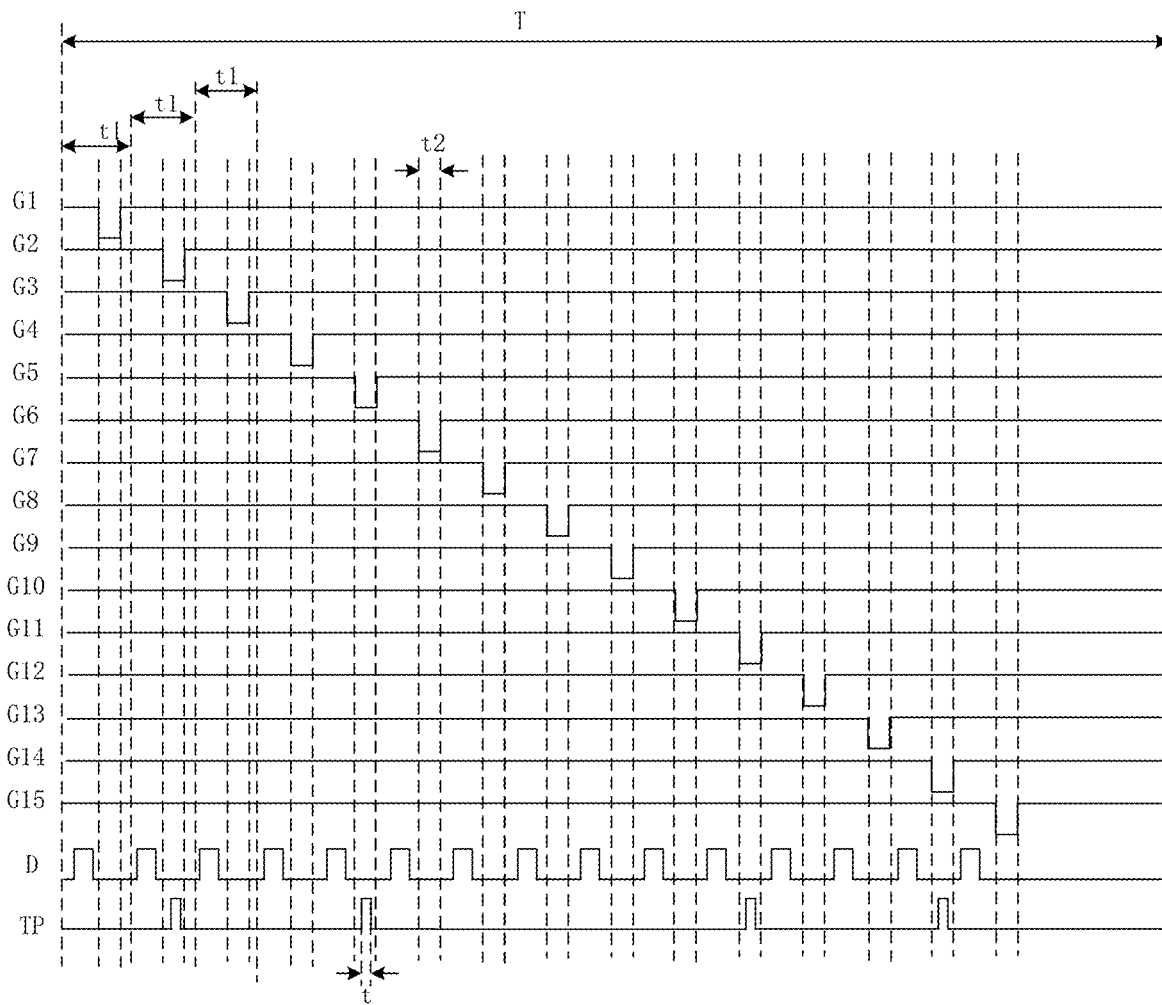
FIG. 13 is a timing diagram of another touch display screen according to an embodiment of the present disclosure.

Exemplarity, FIG. 13 is a timing diagram of another touch display screen according to an embodiment of the present disclosure. FIG. 13 is a timing diagram for driving the touch display screen shown in FIG. 11 by using the driving method of the touch display screen provided by the embodiments of the present disclosure. As shown in FIG. 13, based on FIG. 11, in the second normal sub-display regions and the third normal sub-display regions, the touch control stage t is staggered from the scanning stages t1 of pixel rows electrically connected to the first scanning lines and overlaps the scanning stages t1 of pixel rows electrically connected to the second scanning lines.

It is to be noted that the edge regions in the touch electrode rows have relatively poor touch performance. The changing electrical signals on the signal lines overlapping the edge regions in the touch electrode rows have the greater influence on the touch performance of the touch electrodes. While the center regions have the relatively good touch performance, and the changing electrical signals on the signal lines overlapping the center regions in the touch electrode rows have the smaller influence on the touch performance of the touch electrodes. The touch control stage is set to be staggered from the scanning stages of pixel rows electrically connected to the first scanning lines and overlap the scanning stages of pixel rows electrically connected to the second scanning lines, further reducing the influence of the changing electrical signals on the signal lines overlapping the touch electrodes on the touch performance, and being beneficial to further improving the touch performance of the touch display screen.

With continued reference to FIG. 10, the display region 10 has an I-beam shape.

It is to be noted that in a case where non-display objects such as ornaments are provided at centers of edge regions on both sides of the touch display screen, the rectangular appearance of the touch display screen can be preserved by forming the I-beam shaped display region.

Referring to FIG. 13, the scanning stage of the pixel row electrically connected to a second scanning line includes an enable stage t2 of a scanning signal, and the touch control stage t overlaps the enable stage t2.

Such that the touch control stage t can avoid the write stage of the data signal and the enable stage of the scanning signal in some regions at the same time, reducing the influence of the changing data signals and the changing scanning signals on the touch performance and improving the touch performance of the touch display screen.

With continued reference to FIG. 13, the touch control stage t is completely covered by the enable stage t2.

Such that the touch control stage t can be staggered from the changing moment of the scanning signals, thereby further reducing the influence of the scanning signals on the touch performance.

Figure 14:
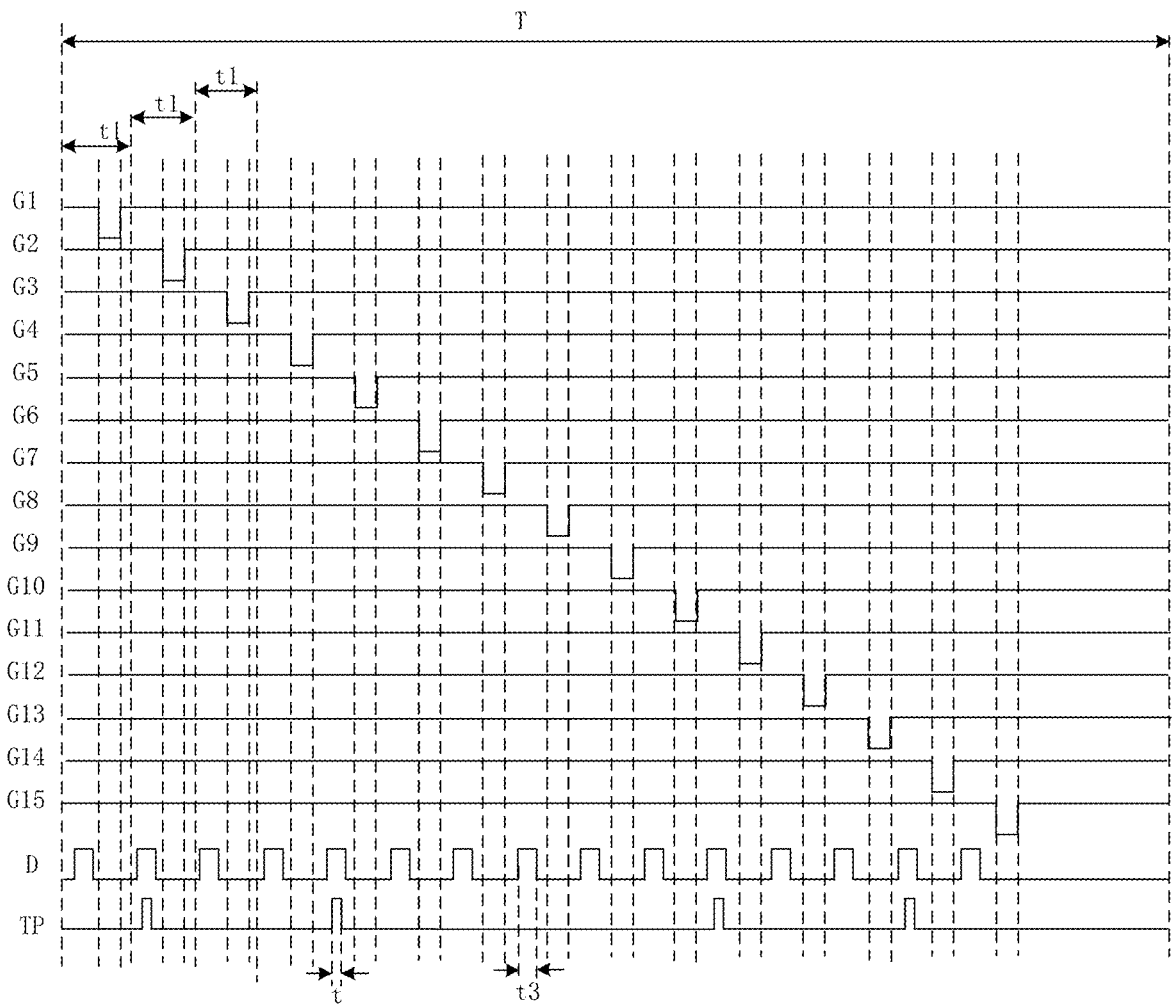
FIG. 14 is a timing diagram of another touch display screen according to an embodiment of the present disclosure.

FIG. 14 is a timing diagram of another touch display screen according to an embodiment of the present disclosure. Different from FIG. 13, each scanning stage of the pixel rows electrically connected to the second scanning lines includes a write stage t3 of the data signal, and the touch control stage t overlaps the write stage t3.

Such that the touch control stage t can similarly be staggered from the changing moment of the scanning signals, thereby further reducing the influence of the scanning signals on the touch performance.

Referring to FIG. 10, the multiple touch electrodes 410 are self-capacitive touch electrodes, and the multiple touch electrodes are arranged in a matrix.

It is to be noted that a capacitance is formed between a self-capacitive touch electrode and the ground, and when a user performs touching, a capacitance between a hand and the touch electrodes is superimposed with the capacitance between the self-capacitive electrodes and the ground, so that the touch detection can be achieved by detecting a change of the capacitance. It is to be noted that an electric field distribution on an edge region of the self-capacitive touch electrode is different from an electric field distribution on a center region, resulting in the relatively poor touch performance. The scanning stages of pixel rows electrically connected to the second scanning lines 320 overlapping the center regions 402 of the self-capacitive touch electrodes are set to overlap the touch control stage, and the scanning stages of the pixel rows electrically connected to the first scanning lines 310 overlapping the edge regions 401 of the self-capacitive touch electrodes are staggered from the touch control stage, thus reducing the influence of the edge regions 401 having the relatively poor touch performance on the touch performance.

Figure 15:
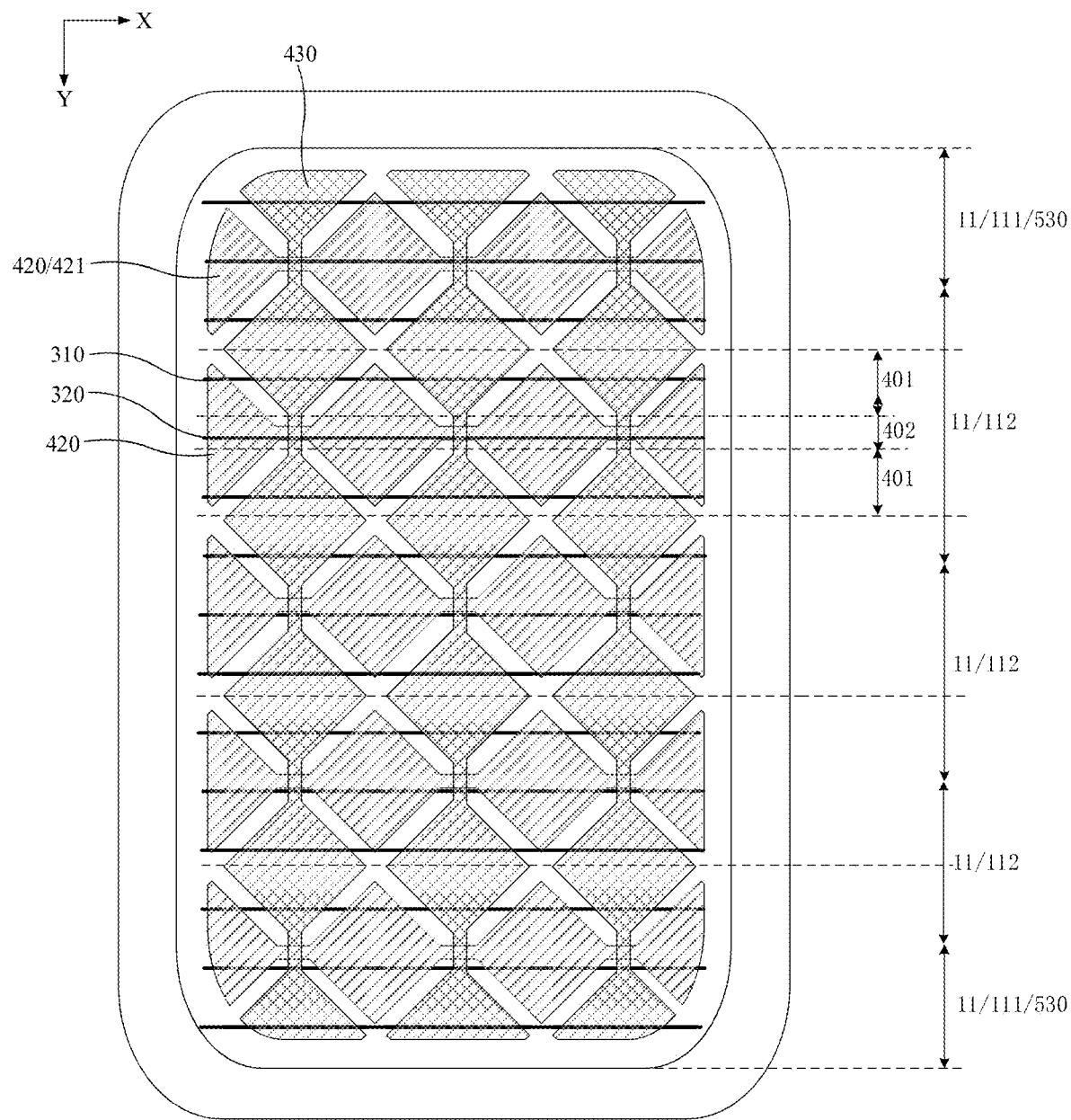
FIG. 15 is a structure diagram of another touch display screen according to an embodiment of the present disclosure.
Figure 16:
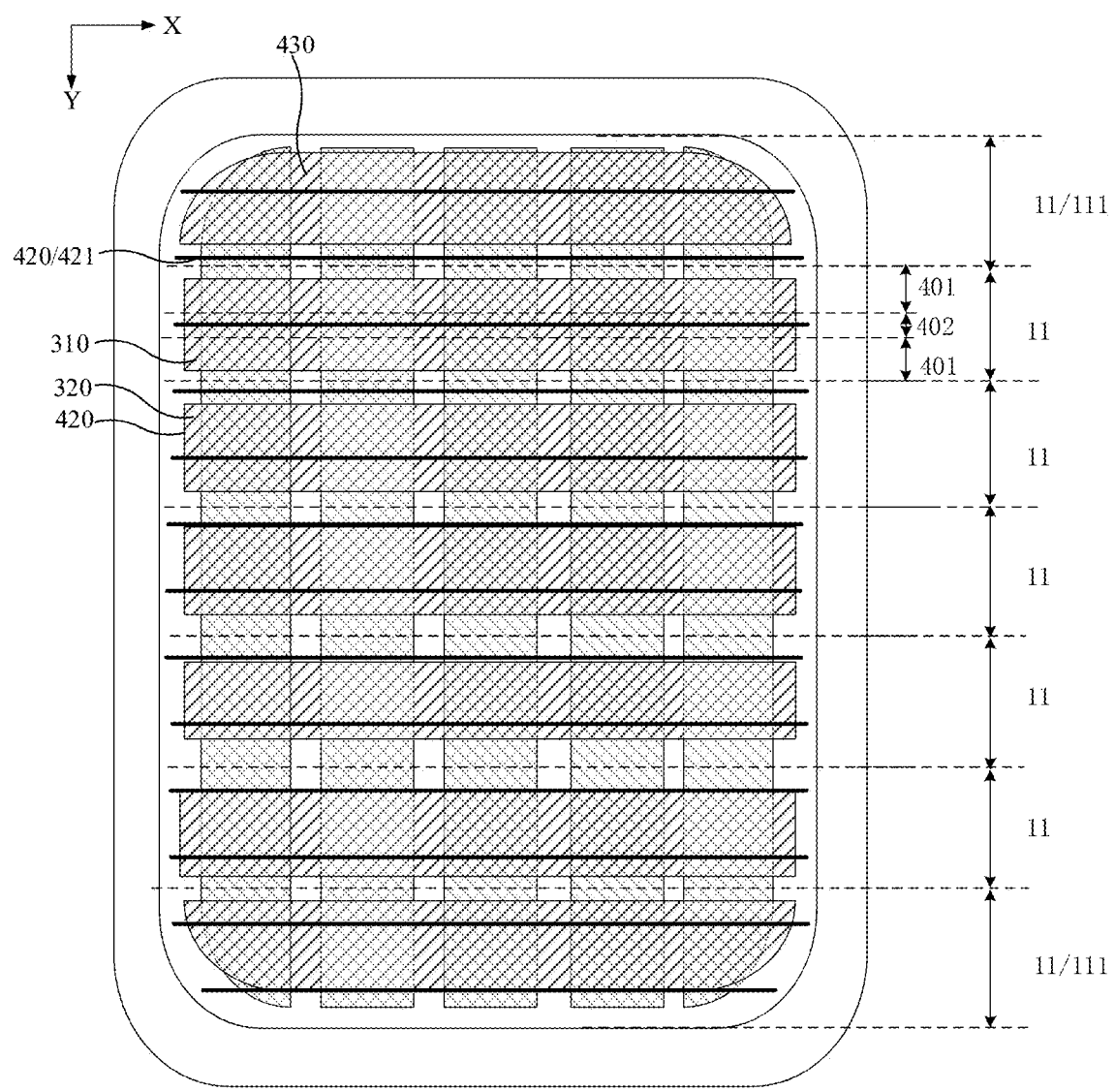
FIG. 16 is a structure diagram of another touch display screen according to un embodiment of the present disclosure.

FIG. 15 is a structure diagram of another touch display screen according to an embodiment of the present disclosure. FIG. 16 is a structure diagram of another touch display screen according to an embodiment of the present disclosure. As shown in FIG. 15 and FIG. 16, the multiple touch electrodes are mutual-capacitive touch electrodes, and the touch electrode layer further includes multiple touch electrode columns 430 formed by the multiple touch electrodes, the multiple touch electrode columns 430 extend along the second direction Y. The multiple touch electrode rows 420 are driving electrode rows, and the multiple touch electrode columns 430 are sensing electrode columns.

This is a mutual-capacitance structure. A capacitance is formed between a driving electrode row and a sensing electrode column, and when the user performs touching, a capacitance between the hand and the touch electrodes is superimposed with the capacitance between the driving electrode rows and the sensing electrode columns, so that the touch detection can be achieved by detecting the change of the capacitance. It can be understood that similar to the self-capacitance touch electrodes, the mutual-capacitance touch electrodes also have the issue that the touch performance on the edge regions 401 is relatively poor. The scanning stages of pixel rows electrically connected to the second scanning lines 320 overlapping the center regions 402 of the mutual-capacitive touch electrodes are set to overlap the touch control stage, and the scanning stages of the pixel rows electrically connected to the first scanning lines 310 overlapping the edge regions 401 of the mutual-capacitive touch electrodes are staggered from the touch control stage, thus reducing the influence of the edge regions 401 having the relatively poor touch performance on the touch performance.

Figure 17:
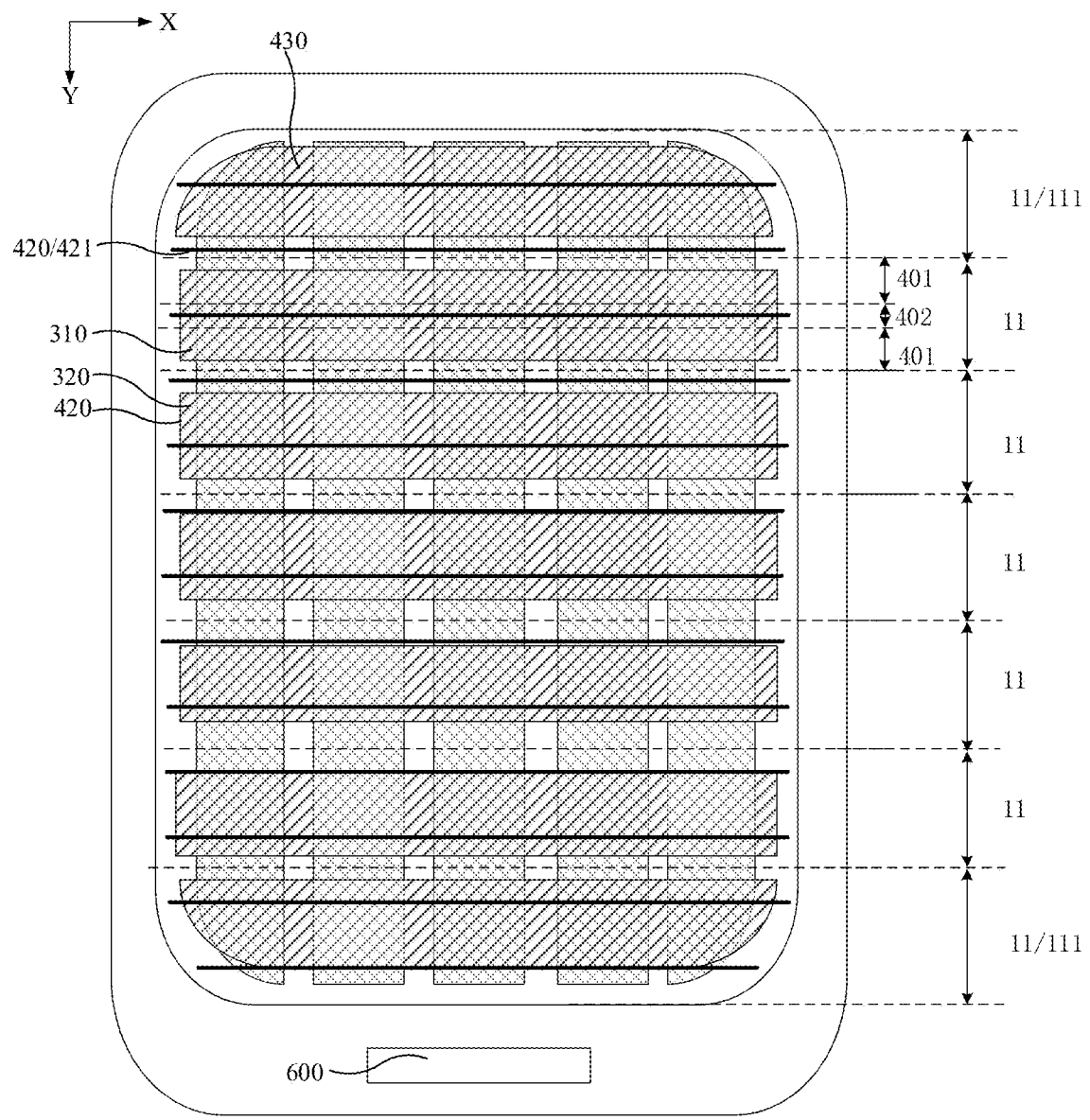
FIG. 17 is a structure diagram of another touch display screen according to an embodiment of the present disclosure.

FIG. 17 is a structure diagram of another touch display screen according to an embodiment of the present disclosure. As shown in FIG. 17, the touch display screen includes a driver chip 600, and the driver chip 600 provides the touch control signal of the touch control stage and the data signal of the scanning stage.

In this way, the same driver chip 600 may be used for providing the touch control signal and the data signal, and different driver chips 600 respectively for providing the touch control signal and the data signal are not needed, thus facilitating simplification of the internal structure of the touch display screen and reducing the volume of the touch display screen.

A display screen is provided in embodiments of the present disclosure, and which is driven by the driving method in any embodiment of the present disclosure. Since the touch display screen provided in this embodiment is driven by the driving method in any embodiment of the present disclosure, the touch display screen has the same or corresponding beneficial effects as the driving method included therein, and details are not described here again.

It is to be noted that the preceding are only exemplary embodiments of the present disclosure and the technical principles used therein. It will be appreciated by those skilled in the art that the present disclosure is not limited to the embodiments described herein. For those skilled in the art, various apparent modifications, adaptations, combinations and substitutions can be made without departing from the scope of the present disclosure. Therefore, while the present disclosure has been described in detail via the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A driving method of a touch display screen, wherein the touch display screen comprises a substrate, a plurality of pixels, a plurality of scanning lines and a touch electrode layer, wherein the plurality of scanning lines extend along a first direction and are arranged on one side of the substrate in a second direction, the plurality of pixels are arranged as a plurality of pixel rows extending along the first direction, and pixels in each of the plurality of pixel rows are electrically connected to at least one of the plurality of scanning lines; the touch electrode layer at least partially overlaps the plurality of scanning lines in a direction perpendicular to a plane where the substrate is located; and the touch electrode layer comprises a plurality of touch electrode rows formed by a plurality of touch electrodes; wherein the plurality of touch electrodes comprise a special-shaped touch electrode, the plurality of touch electrode rows comprise a special-shaped touch electrode row, the special-shaped touch electrode row comprises the special-shaped touch electrode, and the plurality of touch electrode rows extend along the first direction;

wherein the touch display screen comprises a display region, the display region comprises a plurality of sub-display regions arranged along the second direction, the plurality of the sub-display regions are in one-to-one correspondence with the plurality of touch electrode rows and each of the plurality of the sub-display regions overlaps a respective one of the plurality of touch electrode rows; the plurality of sub-display regions comprises at least one special-shaped sub-display region, and the at least one special-shaped sub-display region corresponds to the special-shaped touch electrode row; and in the plurality of sub-display regions, the plurality of scanning lines comprise first scanning lines and second scanning lines, the first scanning lines overlap edge regions of the plurality of touch electrode rows along the second direction, and the second scanning lines overlaps center regions of the plurality of touch electrode rows along the second direction; and wherein one frame cycle comprises at least one touch control stage, the at least one touch control stage is staggered from a scanning stage of a pixel row electrically connected to at least one of the first scanning lines and overlaps a scanning stage of a pixel row electrically connected to at least one of the second scanning lines;

wherein the at least one special-shaped sub-display region has one of the following characteristics:

(i) the at least one special-shaped sub-display region comprises two first special-shaped sub-display regions and a plurality of second special-shaped sub-display regions, and along the second direction, the two first special-shaped sub-display regions are located on opposite sides of the plurality of second special-shaped sub-display regions; wherein the two first special-shaped sub-display regions, the special-shaped touch electrode row comprises m special-shaped touch electrodes, wherein m≥2 and m is a positive integer; and in the plurality of second special-shaped sub-display regions, the special-shaped touch electrode row comprises n special-shaped touch electrodes, wherein n is a positive integer and n <m; and wherein in the two first special-shaped sub-display regions, the at least one touch control stage is staggered from both scanning stages of pixel rows electrically connected to the first scanning lines and scanning stages of pixel rows electrically connected to the second scanning lines; and in the plurality of second special-shaped sub-display regions, the at least one touch control stage is staggered from scanning stages of pixel rows electrically connected to second scanning lines and overlaps scanning stages of pixel rows electrically connected to second scanning lines;

(ii) the at least one special-shaped sub-display region comprises two third special-shaped sub-display regions, the plurality of sub-display regions comprise a plurality of first normal sub-display regions, and along the second direction, the two third special-shaped sub-display regions are located on opposite sides of the plurality of first normal sub-display regions; and in the two third special-shaped sub-display regions, the at least one touch control stage is staggered from both scanning stages of pixel rows electrically connected to first scanning lines and scanning stages of pixel rows electrically connected to second scanning lines; or (iii) the at least one special-shaped sub-display region comprises at least one fourth special-shaped sub-display region, the plurality of sub-display regions comprise a plurality of second normal sub-display regions and a plurality of third normal sub-display regions; and along the second direction, the plurality of second normal sub-display regions are located on a first side of the at least one fourth special-shaped sub-display region and the plurality of third normal sub-display regions are located on a second side of the at least one fourth special-shaped sub-display region; and wherein in the at least one fourth special-shaped sub-display region, the at least one touch control stage is staggered from both scanning stages of pixel rows electrically connected to first scanning lines and scanning stages of pixel rows electrically connected to second scanning lines.

2. The driving method of claim 1, wherein in the characteristic (i), the display region is circular or oval.

3. The driving method of claim 1, wherein in the characteristic (ii), in the plurality of first normal sub-display regions, the at least one touch control stage is staggered from scanning stages of pixel rows electrically connected to first scanning lines and overlaps scanning stages of pixel rows electrically connected to second scanning lines.

4. The driving method of claim 1, wherein in the characteristic (ii), in the plurality of first normal sub-display regions, the at least one touch control stage overlaps both scanning stages of pixel rows electrically connected to first scanning lines and scanning stages of pixel rows electrically connected to second scanning lines.

5. The driving method of claim 1, wherein in the characteristic (ii), the display region has a shape of a quadrilateral, wherein the quadrilateral comprises two opposite straight sides parallel to each other and two opposite arcuate sides respectively projecting toward a side away from a geometric center of the quadrilateral.

6. The driving method of claim 1, wherein in the characteristic (iii), in the plurality of second normal sub-display regions and the plurality of third normal sub-display regions, the at least one touch control stage is staggered from scanning stage of pixel rows electrically connected to first scanning lines and overlaps scanning stages of pixel rows electrically connected to second scanning lines.

7. The driving method of claim 1, wherein in the characteristic (iii), in the plurality of second normal sub-display regions and the plurality of third normal sub-display regions, the at least one touch control stage overlaps both scanning stages of pixel rows electrically connected to first scanning lines and scanning stages of pixel rows electrically connected to second scanning lines.

8. The driving method of claim 1, wherein in the characteristic (iii), the display region has an I-beam shape.

9. The driving method of claim 1, wherein each scanning stage of pixel rows electrically connected to the second scanning lines comprises an enable stage of a scanning signal, and the at least one touch control stage overlaps the enable stage.

10. The driving method of claim 9, wherein the at least one touch control stage is completely covered by the enable stage.

11. The driving method of claim 1, wherein each scanning stage of pixel rows electrically connected to the second scanning lines comprises a write stage of a data signal, and the at least one touch control stage overlaps the write stage.

12. The driving method of claim 1, wherein the plurality of touch electrodes are self-capacitive touch electrodes, and the plurality of the touch electrodes are arranged in a matrix.

13. The driving method of claim 1, wherein the plurality of touch electrodes are mutual-capacitive touch electrodes, the touch electrode layer further comprises a plurality of touch electrode columns formed by the plurality of touch electrodes, and the plurality of touch electrode columns extend along the second direction; and wherein the plurality of touch electrode rows are driving electrode rows, and the plurality of touch electrode columns are sensing electrode columns.

14. The driving method of claim 1, wherein the touch display screen comprises a driver chip, and the driver chip provides a touch control signal of the at least one touch control stage and a data signal of a scanning stage.

15. A touch display screen, comprising a substrate, a plurality of pixels, a plurality of scanning lines and a touch electrode layer; wherein the plurality of scanning lines extend along a first direction and are arranged on one side of the substrate in a second direction, the plurality of pixels are arranged as a plurality of pixel rows extending along the first direction, and pixels in each of the plurality of pixel rows are electrically connected to at least one of the plurality of scanning lines; the touch electrode layer at least partially overlaps the plurality of scanning lines in a direction perpendicular to a plane where the substrate is located; and the touch electrode layer comprises a plurality of touch electrode rows formed by a plurality of touch electrodes; wherein the plurality of touch electrodes comprise a special-shaped touch electrode, the plurality of touch electrode rows comprise a special-shaped touch electrode row, the special-shaped touch electrode row comprises the special-shaped touch electrode, and the plurality of touch electrode rows extend along the first direction;

wherein the touch display screen comprises a display region, the display region comprises a f the sub-display regions are in one-to-one correspondence with the plurality of touch electrode rows and each of the plurality of the sub-display regions overlaps a respective one of the plurality of touch electrode rows; the plurality of sub-display regions comprises at least one special-shaped sub-display region, and the at least one special-shaped sub-display region corresponds to the special-shaped touch electrode row; and in the plurality of sub-display, regions, the plurality of scanning lines comprise first scanning lines and second scanning lines, the first scanning lines overlap edge regions of the plurality of touch electrode rows along the second direction, and the second scanning lines overlaps center regions of the plurality of touch electrode rows along the second direction; and wherein one frame cycle comprises at least one touch control stage, the at least one touch control stage is staggered from a scanning stage of a pixel row electrically connected to at least one of the first scanning lines and overlaps a scanning stage of a pixel row electrically connected to at least one of the second scanning lines;

wherein the at least one special-shaped sub-display region has one of the following characteristics:

(i) the at least one special-shaped sub-display region comprises two first special-shaped sub-display regions and a plurality of second special-shaped sub-display regions, and along the second direction, the two first special-shaped sub-display regions are located on opposite sides of the plurality of second special-shaped sub-display regions; wherein in the two first special-shaped sub-display regions, the special-shaped touch electrode row comprises m special-shaped touch electrodes, wherein m≥2 and m is a positive integer; and in the plurality of second special-shaped sub-display regions, the special-shaped touch electrode row comprises n special-shaped touch electrodes, wherein n is a positive integer and n <m; and wherein in the two first special-shaped sub-display regions, the at least one touch control stage is staggered from both scanning stages of pixel rows electrically connected to the first scanning lines and scanning stages of pixel rows electrically connected to the second scanning lines; and in the plurality of second special-shaped sub-display regions, the at least one touch control stage is staggered from scanning stages of pixel rows electrically connected to first scanning lines and overlaps scanning stages of pixel rows electrically connected to second scanning lines;

(ii) the at least one special-shaped sub-display region comprises two third special-shaped sub-display regions, the pllurality of sub-display regions comprise a plurality of first normal sub-display regions, and along the second direction, the two third special-shaped sub-display regions are located on opposite sides of the plurality of first normal sub-display regions; and in the two third special-shaped sub-display regions, the at least one touch control stage is staggered from both scanning stages of pixel rows electrically connected to first scanning lines and scanning stages of pixel rows electrically connected to second scanning lines; or (iii) the at least one special-shaped sub-display region comprises at least one fourth special-shaped sub-display region, the plurality of sub-display regions comprise a plurality of second normal sub-display regions and a plurality of third normal sub-display regions; and along the second direction, the plurality of second normal sub-display regions are located on a first side of the at least one fourth special-shaped sub-display region and the plurality of third normal sub-display regions are located on a second side of the at least one fourth special-shaped sub-display region; and wherein in the at least one fourth special-shaped sub-display region, the at least one touch control stage is staggered from both scanning stages of pixel rows electrically connected to first scanning lines and scanning stages of pixel rows electrically connected to second scanning lines.

16. A driving method of a touch display screen, wherein the touch display screen comprises a substrate, a plurality of pixels, a plurality of scanning lines and a touch electrode layer, wherein the plurality of scanning lines extend along a first direction and are arranged on one side of the substrate in a second direction, the plurality of pixels are arranged as a plurality of pixel rows extending along the first direction, and pixels in each of the plurality of pixel rows are electrically connected to at least one of the plurality of scanning lines; the touch electrode layer at least partially overlaps the plurality of scanning lines in a direction perpendicular to a plane where the substrate is located; and the touch electrode layer comprises a plurality of touch electrode rows formed by a plurality of touch electrodes;

wherein the plurality of touch electrodes comprise a special-shaped touch electrode, the plurality of touch electrode rows comprise a special-shaped touch electrode row, the special-shaped touch electrode row comprises the special-shaped touch electrode, and the plurality of touch electrode rows extend along the first direction;

wherein the touch display screen comprises a display region, the display region comprises a plurality of sub-display regions arranged along the second direction, the plurality of the sub-display regions are in one-to-one correspondence with the plurality of touch electrode rows and each of the plurality of the sub-display regions overlaps a respective one of the plurality of touch electrode rows; the plurality of sub-display regions comprises at least one special-shaped sub-display region, and the at least one special-shaped sub-display region corresponds to the special-shaped touch electrode row; and in the plurality of sub-display regions, the plurality of scanning lines comprise first scanning lines and second scanning lines, the first scanning lines overlap edge regions of the plurality of touch electrode rows along the second direction, and the second scanning lines overlaps center regions of the plurality of touch electrode rows along the second direction; and wherein one frame cycle comprises at least one touch control stage, the at least one touch control stage is staggered from a scanning stage of a pixel row electrically connected to at least one of the first scanning lines and overlaps a scanning stage of a pixel row electrically connected to at least one of the second scanning lines;

wherein each scanning stage of pixel rows electrically connected to the second scanning lines comprises an enable stage of a scanning signal, and the at least one touch control stage overlaps the enable stage; or each scanning stage of pixel rows electrically connected to the second scanning lines comprises a write stage of a data signal, and the at least one touch control stage overlaps the write stage.

17. The driving method of claim 16, wherein the at least one touch control stage is completely covered by the enable stage.

18. The driving method of claim 16, wherein the plurality of touch electrodes are self-capacitive touch electrodes, and the plurality of the touch electrodes are arranged in a matrix.

19. The driving method of claim 16, wherein the plurality of touch electrodes are mutual-capacitive touch electrodes, the touch electrode layer further comprises a plurality of touch electrode columns formed by the plurality of touch electrodes, and the plurality of touch electrode columns extend along the second direction; and wherein the plurality of touch electrode rows are driving electrode rows, and the plurality of touch electrode columns are sensing electrode columns.

20. The driving method of claim 16, wherein the touch display screen comprises a driver chip, and the driver chip provides a touch control signal of the at least one touch control stage and a data signal of a scanning stage.

\* \* \* \* \*